US012595272B2

(12) United States Patent     (10) Patent No.: US 12,595,272 B2

Edson et al.     (45) Date of Patent: Apr. 7, 2026

(54) METHODS TO PRODUCE ORGANOTIN COMPOSITIONS WITH CONVENIENT LIGAND PROVIDING REACTANTS

(71) Applicant: Inpria Corporation, Corvallis, OR (US)

(72) Inventors: Joseph B. Edson, Corvallis, OR (US); Brian J. Cardineau, Corvallis, OR (US); William Earley, Corvallis, OR (US); Kierra Huihui-Gist, Albany, OR (US); Thomas J. Lamkin, Corvallis, OR (US); Robert E. Jilek, Philomath, OR (US)

(73) Assignee: Inpria Corporation, Corvallis, OR (US)

( * ) Notice: Subject to any disclaimer, the term of this patent is extended or adjusted under 35 U.S.C. 154(b) by 1 day.

(21) Appl. No.: 17/410,316

(22) Filed: Aug. 24, 2021

(65) Prior Publication Data

US 2022/0064192 A1     Mar. 3, 2022

Related U.S. Application Data

(60) Provisional application No. 63/191,646, filed on May 21, 2021, provisional application No. 63/070,098, filed on Aug. 25, 2020.

(51) Int. Cl.
$C07F\ 7/22$     (2006.01)

(52) U.S. Cl.
CPC .......... C07F 7/2284 (2013.01); C07F 7/2208 (2013.01); C07F 7/2224 (2013.01)

(58) Field of Classification Search
CPC ..... C07F 7/2284; C07F 7/2208; C07F 7/2224
See application file for complete search history.

(56) References Cited

U.S. PATENT DOCUMENTS

| | | | |
|---|---|---|---|
| 3,454,610 A | 7/1969 | Langer | |
| 3,459,779 A | 8/1969 | Neumann et al. | |
| 3,862,198 A | 1/1975 | Kugele et al. | |
| 4,604,475 A | 8/1986 | Buschhoff et al. | |
| 5,463,003 A | 10/1995 | Horikawa et al. | |
| 6,768,017 B2 | 7/2004 | Thoonen et al. | |
| 7,592,472 B2 | 9/2009 | Boele et al. | |
| 8,198,352 B2 | 6/2012 | Deelman et al. | |
| 9,310,684 B2 | 4/2016 | Meyers et al. | |
| 10,228,618 B2 | 3/2019 | Meyers et al. | |
| 10,642,153 B2 | 5/2020 | Meyers et al. | |
| 2005/0038287 A1 | 2/2005 | Scherer et al. | |
| 2016/0116839 A1* | 4/2016 | Meyers ................... | G03F 7/325 430/326 |
| 2019/0308998 A1 | 10/2019 | Cardineau et al. | |
| 2019/0315781 A1 | 10/2019 | Edson et al. | |
| 2019/0315782 A1* | 10/2019 | Edson ................... | C07F 7/2284 |
| 2020/0239498 A1* | 7/2020 | Clark ................... | G03F 7/2004 |
| 2020/0241413 A1 | 7/2020 | Clark et al. | |
| 2022/0002323 A1* | 1/2022 | Ermert ................. | C07F 7/2284 |
| 2022/0242889 A1* | 8/2022 | Ermert ................. | C07F 7/2296 |
| 2022/0306657 A1* | 9/2022 | Fabulyak ............... | C04B 41/91 |
| 2022/0397826 A1* | 12/2022 | Jilek ..................... | C07F 7/2224 |
| 2024/0199658 A1* | 6/2024 | Jilek ....................... | B01J 35/39 |

FOREIGN PATENT DOCUMENTS

| | | |
|---|---|---|
| JP | 2004-346074 A | 12/2004 |
| KR | 10-2012-0102985 A | 9/2012 |
| KR | 10-1255099 B1 | 4/2013 |
| RU | 2317993 C1 | 2/2008 |
| WO | 2017-066319 A1 | 4/2017 |
| WO | 2019-023797 A1 | 2/2019 |
| WO | 2020-264158 A1 | 12/2020 |

OTHER PUBLICATIONS

C. Laplaza et al., 14 Organometallics, 577-580 (1995) (Year: 1995).*

N.G. Anderson, Practical Process & Research Development, "Chapter 5, Running the Reaction", 113-143, (2000) (Year: 2000).*

The American Heritage® Dictionary of the English Language, Fifth Edition copyright 2022 (Year: 2022).*

The American Heritage® Dictionary of the English Language, Third Edition copyright 2000 (Year: 2000).*

N. G. Anderson, Practical Process & Research Development, 27-52, 81-111, 113-143 (2000) (Year: 2000).*

International Union of Pure and Applied Chemistry, Compendium of Chemical Terminology (IUPAC), Gold Book, p. 694 of 1622 (2014) (Year: 2014).*

T. Rathman et al., 18 Organic Process Research & Development, 1192-1210 (2014) (Year: 2014).*

Chemical Abstract Compound, STNext, RN 70760-42-8, (Nov. 16, 1984).

Hänssgen et al., "Synthese Der Ersten Mono-t-Butylzinn-Elementverbidungen", Journal of Organometallic Chemistry, vol. 293 No. 191, (1985).

Lamandé-Langle et al., "A Novel Mode of Access to Polyfunctional Organotin Compounds and Their Reactivity in Stille Cross-Coupling Reaction", Journal of Organometallic Chemistry, vol. 694 No. 15, p. 2368-2374, (2009).

(Continued)

*Primary Examiner* — Alexander R Pagano

(74) *Attorney, Agent, or Firm* — Christensen, Fonder, Dardi PLLC; Diane E. Bennett; Peter S. Dardi

(57) ABSTRACT

Synthesis reactions are described to efficiently and specifically form compounds of the structure $RSnL_3$, where R is an organic ligand to the tin, and L is hydrolysable ligand or a hydrolysis product thereof. The synthesis is effective for a broad range of R ligands. The synthesis is based on the use of alkali metal ions and optionally alkaline earth (pseudo-alkaline earth) metal ions. Compounds are formed of the structures represented by the formulas $RSn(C \equiv CSiR'_3)_3$, $R'R''ACSnL_3$, where A is a halogen atom (F, Cl, Br or I) or an aromatic ring with at least one halogen substituent, $R'R''(R''O)\,CSnL_3$ or $R'R''\,(N \equiv C)\,CSnZ_3$.

17 Claims, 17 Drawing Sheets

(56)             References Cited

OTHER PUBLICATIONS

Wrackmeyer et al., "1, 1-Organoboration of tri-1-alkynyltin Compounds: Novel Trigorganotin Cations, Stannoles, 3-Stannolenes and 1-stanna-4-bora-2, 5-cyclohexadienes", Inorganica Chimica Acta, vol. 220 No. 1-2, p. 161-173, (1994).

International Search Report for corresponding Patent Application No. PCT/US2021/047299 dated Dec. 15, 2021.

Andreocci et al., "Electronic structure of tetrahedral tin acetylides by pseudopotential ab initio calculation and gas-phase UV photo-electron spectroscopy", Journal of Molecular Structure (Theochem), vol. 254, p. 171-176, (1992).

Search Report from corresponding European Patent Application No. 21862548 dated Feb. 7, 2025.

"Experimental Chemistry Course", 5th Edition, vol. 13, Synthesis of Organic Compounds I—Hydrocarbons and Halides, Editor: Chemical Society of Japan, p. 102, (2004).

Office Action from corresponding Japanese Patent Application No. 2023-513393 dated Mar. 11, 2025.

Search Report from corresponding Singaporean Patent Application No. 11202300682S dated Oct. 7, 2025.

* cited by examiner

METHODS TO PRODUCE ORGANOTIN COMPOSITIONS WITH CONVENIENT LIGAND PROVIDING REACTANTS

CROSS REFERENCE TO RELATED APPLICATIONS

This application claims priority to U.S. provisional patent applications 63/070,098 filed Aug. 25, 2020 to Edson et al., entitled "Methods to Produce Monoalkyl Tin Compositions Wit Low Concentration of Contaminants," and 63/191,646 filed on May 21, 2021 to Cardineau et al., entitled "High EUV Absorption Organotin Patterning Compositions and Coatings," both of which are incorporated herein by reference.

FIELD OF THE INVENTION

The invention relates to improved methods for the production of mono-organotin triamides and mono-organotin triacetylides, wherein the organo group is defined as a hydrocarbyl with or without one or more heteroatoms.

BACKGROUND OF THE INVENTION

Organometallic compounds provide metal ions in solution-processible and vapor-phase forms for deposition of thin films. Organotin compounds provide a radiation sensitive Sn—C bond that can be used to lithographically pattern thin films. The manufacture of semiconductor devices at ever shrinking dimensions requires new versatile materials to achieve required patterning resolutions; organotin compounds promise to deliver needed patterning advantages.

SUMMARY OF THE INVENTION

In one aspect, the invention pertains to a solution comprising an organic solvent; and an organometallic composition dissolved in the solvent. The organometallic composition comprises alkali metal ions, tin ions and organic ligands bonded to the tin as —$SnL_3$, wherein the organic ligands (L) are represented by —$NR'_2$, —$C≡CR^S$, or a mixture thereof, where $R^S$ is $SiR''_3$ or R', the three R" are independently H or R', and R' are independently hydrocarbyl groups with from 1 to 31 carbon atoms and optional unsaturated carbon-carbon bonds, optional aromatic groups and optional hetero atoms. In some embodiments, the organometallic composition further comprises alkaline earth ions (Be(+2), Mg(+2), Ca(+2), Sr(+2), Ba(+2)) or pseudo-alkaline earth ions (Zn (+2), Cd(+2) or Hg(+2/+1)).

In another aspect, the invention pertains to a method for forming an alkali metal tin composition, in which the method comprises reacting ML and tin (II) halide ($SnX_2$, X=F, Cl, Br, I or a mixture thereof) and optionally $M'OR^0$ in an organic solvent, where M is Li, Na, K, Cs or a combination thereof, M' is Na, K, Cs or a combination thereof and L is dialkylamide (—$NR'_2$) or acetylide (—$C≡CR^S$), to form a corresponding organometallic composition with a moiety $SnL_3$, which is tin triamide (Sn $(NR'_2)_3$) or tin triacetylide ($Sn(C≡CL^S)_3$), present with associated metal cations M", where M" is M' if present or M if M' is not present, $R^0$ is a hydrocarbyl group with from 1 to 31 carbon atoms and optional unsaturated carbon-carbon bonds, optional aromatic groups and optional hetero atoms, $R^S$ is $SiR''_3$ or R', the three R" are independently H or R', and the R' are independently a hydrocarbyl group with from 1 to 31 carbon atoms and optional unsaturated carbon-carbon bonds, optional aromatic groups and optional hetero atoms, to form the alkali metal tin composition. In some embodiments, the method further comprises reacting a (alkaline earth/pseudo-alkaline earth) metal halide ($M'''X_2$, X=F, Cl, Br, I or a mixture thereof) with the alkali metal tin composition to form an alkali metal (alkaline earth/pseudo alkaline earth) metal tin composition, where the alkaline earth/ pseudo-alkaline earth metal is beryllium, magnesium, calcium, strontium, barium, zinc, cadmium, mercury or a combination thereof.

In further aspects, the invention pertains to a method for synthesizing a monohydrocarbyl tin compound, in which the method comprises reacting a primary halide hydrocarbyl compound (R—X, where X is a halide atom) with an organometallic composition comprising $SnL_3$ moieties associated with metal cations M, where M is an alkali metal, alkaline earth metal, and/or pseudo-alkali metal (Zn, Cd, or Hg), and L is either an amide ligand resulting in an alkali metal tin triamide compound or an acetylide ligand resulting in an alkali metal tin triacetylide, to form correspondingly a monohydrocarbyl tin triamide ($RSn(NR'_2)_3$) or a monohydrocarbyl tin triacetylide ($RSn(C≡CL^S)_3$), where the monohydrocarbyl ligand (R) is a hydrocarbyl group with from 1 to 31 carbon atoms and optional unsaturated carbon-carbon bonds, optional aromatic groups and optional hetero atoms, $L^S$ is $SiR''_3$ or R', the three R" are independently H or R', and the R' are independently a hydrocarbyl group with from 1 to 31 carbon atoms and optional unsaturated carbon-carbon bonds, optional aromatic groups and optional hetero atoms, to form the alkali metal tin composition.

In additional aspects, the invention pertains to a compound represented by the formula $RSn(C≡CSiR'_3)_3$, where R' and R are independently a hydrocarbyl group with from 1 to 31 carbon atoms and optional unsaturated carbon-carbon bonds, optional aromatic groups and optional hetero atoms.

Moreover, the invention pertains to a halogenated hydrocarbyl tin compound represented by the formula $R'R''ACSnZ_3$, where A is a halogen atom (F, Cl, Br or I) or an aromatic ring with at least one halogen substituent, where R' and R" are independently H, a halogen, or a hydrocarbyl group with from 1 to 15 carbon atoms and optional unsaturated carbon-carbon bonds, optional aromatic groups and optional hetero atoms, and Z is L, where L is a hydrolysable ligand, or $O_x(OH)_{3-x}$, 0<x<3.

Furthermore, the invention pertains to a hydrocarbyl tin compound represented by the formula $R'R''(R''O)CSnZ_3$ where R', R" and R' are independently H or hydrocarbyl groups having from 1 to 15 carbon atoms and optional unsaturated carbon-carbon bonds, optional aromatic groups and optional hetero atoms, and Z is L, where L is a hydrolysable ligand, or $O_x(OH)_{3-x}$, 0<x<3.

In some aspects, the invention pertains to a hydrocarbyl tin compound represented by the formula $R'R''$ (N≡C) $CSnZ_3$ where R' and R" are independently H or hydrocarbyl groups having from 1 to 15 carbon atoms and optional unsaturated carbon-carbon bonds, optional aromatic groups and optional hetero atoms, and Z is L, where L is a hydrolysable ligand, or $O_x$ $(OH)_{3-x}$, 0<x<3.

DESCRIPTION OF THE INVENTION

Figure 1:
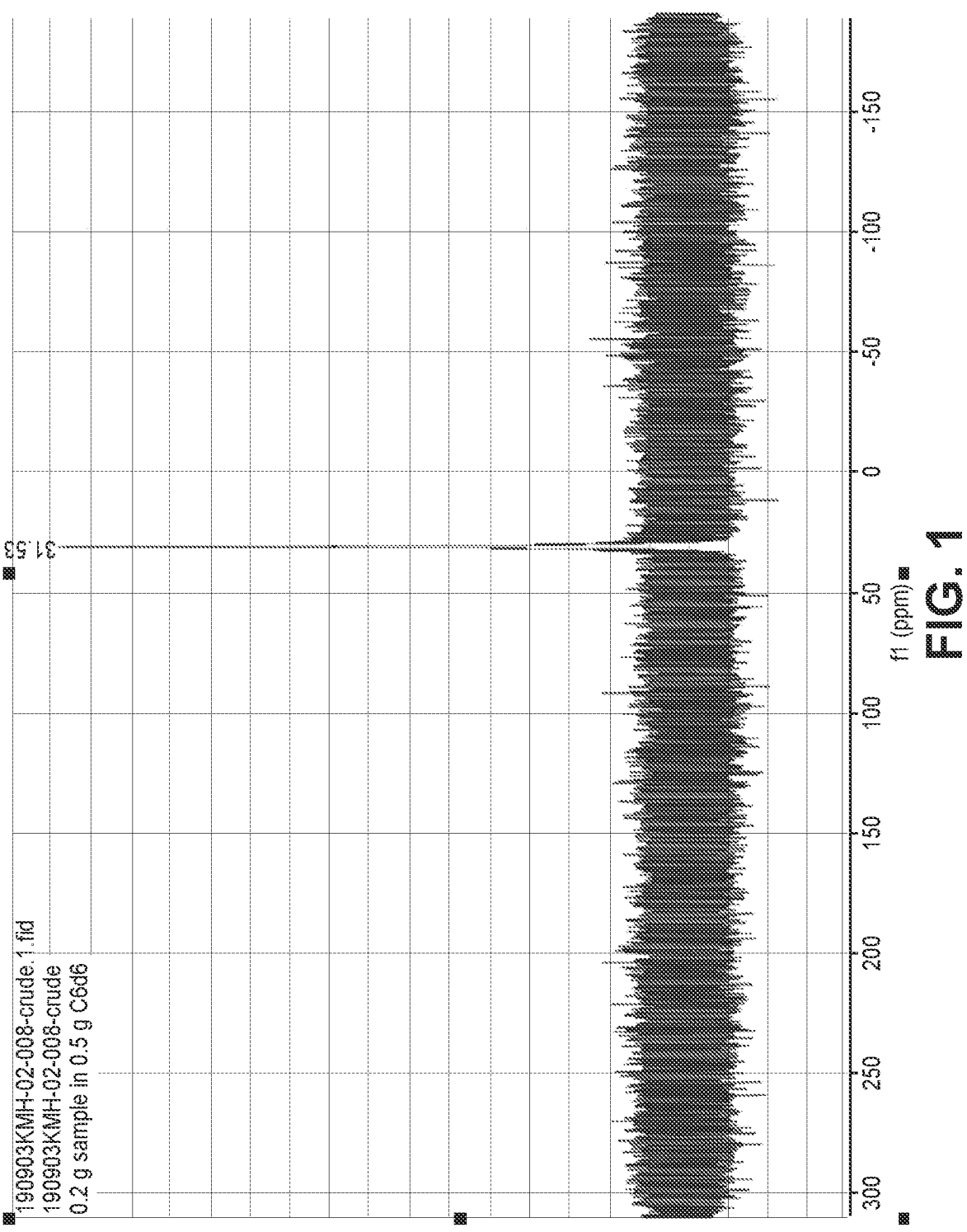
FIG. 1 is a $^{119}Sn$ NMR spectrum of $LiSn(NEt_2)_3$ in benzene-$d_6$.

More versatile and efficient techniques for synthesizing monohydrocarbyl tin compounds are described based on reactions involving an organo-alkali metal compound, stannous halide (SnX$_2$, X is a halide), an organo halide to contribute an R group for a ligand to tin with a (sp$^3$) carbon-tin bond, optionally a further metal compound, and an amine or acetylide to contribute three hydrolysable ligands to the tin (NR'$_2$ or —C≡CR'). The improved synthesis is based on the presumed formation of alkali metal (and/or an alkaline earth or pseudo-alkaline earth metal, as specified below) tin compositions, as an intermediate in the synthesis of the monohydrocarbyl tin compounds, although the various metal tin compositions may be useful intermediates in other contexts. The intermediate metal tin compositions are then reacted with the organo halide to form the R-SnL$_3$ structures where R forms a C—Sn bond and L represents the hydrolysable ligands. The metal tin compounds are found to be stable and characterizable in solution, although their isolation has been elusive to date. These metal tin compositions provide convenient precursors for forming carbon tin bonds through the replacement of the metal (alkali metal and/or alkaline earth and/orpseudo-alkaline earth) with good yields and good specificity for a wide range of organo ligands, which may be due to the energetics of the reactions. These synthesis approaches can be extended then to the synthesis of organotin trialkoxides (triorgano-oxides) from either the triamides or the triacetylides through substitution of the hydrolysable ligands or to oxo/hydroxo compounds through hydrolysis of the ligands. The mono-organo tin compounds, i.e. compounds having a C—Sn bond stable against hydrolysis, can be synthesized directly with very low poly-organo contamination, and the mono-organo tin compounds have been found to be more desirable as radiation sensitive compositions for patterning applications.

While the monoorgano tin triamides can be directly used as precursors for radiation pattering compositions, the trialkoxides have been found to be particularly useful precursors for either solution or vapor deposition of radiation patternable coatings. The synthesis techniques are conducive to incorporation of heteroatom-substituted organo ligands, for example halogenated, and functionalized organo ligands, for example comprising cyano or ether groups, that may not be practical using other known synthesis techniques. The synthesis techniques are found to be effective for efficient formation of a wide range of organo ligands, and halogenated ligands with high radiation absorption, especially iodinated ligands, are described and exemplified. These classes of compounds have been excellent at providing radiation patternable coatings.

As used herein, and as generally consistent with usage in this field, "monoalkyl" can be used interchangeably with "monoorgano" or "monohydrocarbyl" with "alkyl" ligands suggesting bonding to the tin with carbon to form a bond that is generally not hydrolysable through contact with water, which would involve sp$^3$ or sp$^2$ hybridized carbon, while the "alkyl" group can have internal unsaturated bonds and hetero-atoms, i.e., distinct from carbon and hydrogen, that are not involved in bonding with the tin. New synthesis methods described herein yield monohydrocarbyl tin triamide (trihydrocarbylamides) and monohydrocarbyl tri-acetylides (trihydrocarbylacetylides) in high yield and with low (non-tin) metal and polyalkyl (i.e., polyhydrocarbyl) contaminants. The synthesis approaches are amenable for efficient scale up for commercial production with corresponding cost effective products. With improved synthesis approaches described herein, it can become more effective to adopt more diverse range of organic functional groups for both bonding to the tin and/or within the amide or acetylide hydrolysable ligands. The use of reactive species to form the desired compounds involves endothermic reactions. While not wanting to be limited by theory, it is believed that the reactants selected herein alter, possibly slow, the reactions to allow dissipation of generated heat and/or decrease the amount of generated heat to allow formation of less stable R—Sn bonds and/or to provide higher product yields. The alternative terminology described in the first sentence of this paragraph carries over through the specification, but further clarity may follow from the adoption of terminology that more directly reflects range of commonly used species of ligands. Thus, the terminology hydrocarbyl is adopted to describe the ligands, which have an sp$^3$ or sp$^2$ carbon bonded to the tin, although the group does not necessarily have hydrogen atoms. Acetylide ligands with sp carbon bonded to the tin form hydrolysable bonds, so these are readily distinguishable.

The use of alkyl metal coordination compounds in high performance radiation-based patterning compositions is described, for example, in U.S. Pat. No. 9,310,684 to Meyers et al., entitled "Organometallic Solution Based High Resolution Patterning Compositions," incorporated herein by reference. Refinements of these organometallic compositions for patterning are described in U.S. Pat. No. 10,642, 153 to Meyers et al., entitled "Organometallic Solution Based High Resolution Patterning Compositions and Corresponding Methods," and 10,228,618 to Meyers et al. (hereinafter the '618 patent), entitled "Organotin Oxide Hydroxide Patterning Compositions, Precursors, and Patterning." both of which are incorporated herein by reference.

The compositions synthesized herein can be effective precursors for forming the alkyl tin oxo-hydroxo compositions that are advantageous for high resolution patterning, for example in extreme ultraviolet (EUV), ultraviolet (UV), electron-beam lithography. The alkyl tin precursor compositions comprise a group that can be hydrolyzed with water or other suitable reagent under appropriate conditions to form the monohydrocarbyl tin oxo-hydroxo patterning compositions, which, when fully hydrolyzed, can be represented by the formula $RSnO_{(1.5-(x/2))}(OH)_x$ where $0<x \leq 3$. It can be convenient to perform the hydrolysis to form the oxo-hydroxo compositions in situ, such as during deposition and/or following initial coating formation. While the tri-amides and triacetylides described herein can be used under hydrolyzing conditions for forming radiation sensitive coatings for patterning, it can be desirable to form further intermediate hydrocarbyl tin trialkoxides (trihydrocarbyl oxides) for forming the coatings. Processing to form the hydrocarbyl tin trialkoxides are described herein. The various precursor compounds with hydrolysable ligands generally carry forward the R-ligand to tin through the process and are synthesized with this perspective.

With respect to the precursors with hydrolysable ligands, representative hydrolysis and condensation reactions that can transform the compositions with hydrolysable Sn—X groups are indicated in the following reactions:

$$RSnL_3 + 3H_2O \rightarrow RSn(OH)_3 + 3HL,$$

$$RSn(OH)_3 \rightarrow RSnO_{x/2}OH_{3-x} + (x/2)H_2O.$$

If the hydrolysis product HL is sufficiently volatile, in situ hydrolysis can be performed with water vapor during the substrate coating process, but the hydrolysis reaction can also be performed in solution to form the alkyl tin oxo-hydroxo compositions. These processing options are described further in the '618 patent. The overall synthesis process for forming the radiation patternable coatings involves formation of the desired R—Sn(C—Sn) bonds with three hydrolysable ligands, with the potential for exchanging the hydrolysable ligands under suitable circumstances while maintaining the R ligand.

R forms an carbon-tin bond wherein the carbon bound to the tin is $sp^3$ or $sp^2$ hybridized. and R can comprise heteroatoms, which are not carbon or hydrogen. As noted above, for convenience as well as consistency in the art, R can be interchangeably referred to as an alkyl ligand, organo ligand or hydrocarbyl ligand. In some embodiments, alkyl ligands can be desirable for some patterning compositions where the compound can be represented generally as $R^1R^2R^3CSn$ $O_{(2-(z/2)-(x/2))}(OH)_x$, where $R^1$, $R^2$ and $R^3$ are independently hydrogen or an alkyl group with 1-10 carbon atoms. Similarly, this representation of alkyl ligand R is similarly applicable to the other embodiments generally with $R^1R^2R^3CSn(L)_3$, with L corresponding to hydrolysable ligands, such as alkoxide (hydrocarbyl oxide), acetylide or amide moieties. In some embodiments, $R^1$ and $R^2$ can form a cyclic alkyl moiety, and $R^3$ may also join the other groups in a cyclic moiety. Suitable branched alkyl ligands can be, for example, isopropyl($R^1$ and $R^2$ are methyl and $R^3$ is hydrogen), tert-butyl($R^1$, $R^2$ and $R^3$ are methyl), tert-amyl ($R^1$ and $R^2$ are methyl and $R^3$ is —$CH_2CH_3$), sec-butyl($R^1$ is methyl, $R^2$ is —$CH_2CH_3$, and $R^3$ is hydrogen), neopentyl ($R^1$ and $R^2$ are hydrogen, and $R^3$ is —$C(CH_3)_3$), cyclohexyl, cyclopentyl, cyclobutyl, and cyclopropyl. Examples of suitable cyclic groups include, for example, 1-adamantyl (—C $(CH_2)_3$ $(CH)_3$ $(CH_2)_3$ or tricyclo(3.3.1.13,7) decane bonded to the metal at a tertiary carbon) and 2-adamantyl (—CH $(CH)_2(CH_2)+(CH)_2(CH_2)$ or tricyclo(3.3.1.13,7) decane bonded to the metal at a secondary carbon). In other embodiments, hydrocarbyl groups may include aryl or alkenyl groups, for example, benzyl or allyl, or alkynyl groups. In other embodiments, the hydrocarbyl ligand R may include any group consisting solely of C and H and containing 1-31 carbon atoms. In summary, some examples of suitable alkyl groups bonded to tin include, for example, linear or branched alkyl(i-Pr(($CH_3)_2CH$—), t-Bu(($CH_3)_3C$—), Me ($CH_3$—), n-Bu($CH_3CH_2CH_2CH_2$—)), cyclo-alkyl(cyclopropyl, cyclo-butyl, cyclo-pentyl), olefinic (alkenyl, aryl, allylic), or alkynyl groups, or combinations thereof. In further embodiments, suitable R groups may include hydrocarbyl groups substituted with hetero-atom functional groups including cyano, thio, silyl(and germanium analogs), ether, keto, ester, or halogenated groups or combinations thereof. As is conventional in this art, the hydrocarbyl group can be referred to as an alkyl group even though the group can have unsaturated bonds, aryl groups, heteroatoms, and so forth. R groups with halogen atoms are exemplified below and are described in more detail with respect to particular structures. R groups with cyano groups or ether groups are also exemplified below. R groups with silyl moieties are described in copending provisional application 63/210,769 to Jilek et al., entitled "Organotin Patterning Materials: Compositions and Methods," incorporated herein by reference. R groups with deuterated moieties are described in copending U.S. provisional patent application 63/215,720 to Jilek et al., entitled "Deuterated Organotin Compounds," incorporated herein by reference.

Precursor compositions can be employed to form organotin oxo/hydroxo coating compositions that integrate into a common oxo/hydroxo network. The precursor compositions can comprise one or more soluble organotin oxo/hydroxo compounds, or corresponding compounds with hydrolysable ligands that form oxo and/or hydroxo ligands upon hydrolysis and/or condensation. For precursor compositions with a plurality of compounds, the compounds can have distinct organic ligands with metal-carbon bonds and the same or distinct hydrolysable ligands. Thus, precursor compositions to form the radiation sensitive coatings generally can comprise solutions of one or more compounds represented by $RSnL_3$ where R is a hydrocarbyl group with 1-31 carbon atoms, such as described above, and L is a ligand with a hydrolysable M—L bond, and mixtures thereof. For the compositions described herein, dialkylamides and alkyl-lacetylides (—$C \equiv CR^0$) are exemplified as hydrolysable ligands. Dialkylamides and alkylacetylides can be useful as ligands that can be readily replaced and/or reacted to prepare other organotin compositions, such as organotin carboxylates, organotin alkoxides, organotin oxide hydroxides, and the like, that can be advantageous for further processing. Organotin carboxylates can be readily formed through reactions with carboxylic acids. The preparation of organotin alkoxides are described in the Examples below, and the formation of organotin oxide hydroxides are summarized below. Organotin alkoxides comprise alkoxy ligands (—$OR^0$), where the $R^0$ group can be one of the same moieties described above for R so that they can have heteroatoms and unsaturated carbon-carbon bonds. In particular, organotin trialkoxide compositions can be represented by the formula $RSn(OR^0)_3$. Also, organotin tridialkylamide compositions can be represented by the formula $RSn(NR^aR^b)_3$, where the $R^a$ and $R^b$ groups can be independently one of the same moieties described above for R, and hydrocarbyltin trialkylacetylide can be represented by the formula $RSn(C \equiv CR^0)_3$. As with the R ligands, the hydrolysable ligands refer to alkyl amides or alkyl acetylides, which again are known in the art to not be limited to alkyl groups in the strict organic chemistry sense, but can be equivalently described as organo or hydrocarbyl groups. But for these ligands the terminology can become even more unwieldy very quickly, so alkyl is maintained for the hydrolysable ligands with the understanding that this expression should be broadly construed as usual in the art, and silyl derivatives in the hydrolysable ligands are exemplified. In some embodiments, $R^a$, $R^b$, $R^O$ can be independently a linear or branched alkyl ($-C_nH_{2n+1}$, n is 1 to 5).

The monohydrocarbyl tin compositions with hydrolysable ligands generally can be represented by the formula $RSn(L)_3$, where R is defined above in the context of forming a carbon-tin bond via an $sp^3$ or $sp^2$ carbon, and the above broad discussion of R can be considered repeated here in full detail. With respect to the hydrolysable ligands, L can be $-OR'$, $NR'_2$, or $-C≡CR'$. In general, R' can be any of any of the species described above for R with an $sp^3$ or $sp^2$ carbon bonded to the adjacent atom as with R. and specifically can optionally include unsaturated carbon-carbon bonds, aromatic moieties and heteroatoms. Silicon heteroatoms are specifically exemplified below. As with R, the terminology "alkyl" or "alk", as in alkoxy, is not intended to imply limitations to saturated hydrocarbons free of heteroatoms, so it may be alternatively referred to as hydorcarbyl or organo groups. In some embodiments, R' can comprise≤10 carbon atoms and can be, for example, methyl, ethyl, propyl, isopropyl, butyl, t-butyl, isobutyl, or t-amyl. The R group can be a linear, branched, (i.e., secondary or tertiary at the metal-bonded carbon atom), or cyclic group. Embodiments in which R' comprises a silicon atom are described further below and are exemplified. Various synthesis embodiments are described herein that are based on a common concept of first synthesizing an intermediate mixture represented with the formula of $MSnL_3$, where M is one or more (+1) or (+2) metal ions and L is a hydrolysable ligand, specifically a dialkylamide or an alkyl acetylide. Generally, the intermediate is formed at concentrations based on tin content form about 0.005M to about 2M, in further embodiment from about 0.01M to about 1.75M and in other embodiments from about 1.5M to about 0.025M. A person of ordinary skill in the art will recognize that additional ranges of concentration within these explicit ranges are contemplated and are within the present disclosure. This intermediate is reacted with RX where X is a halide atom to form $RSnL_3$, which can be further used as desired. In some embodiments, M can be Li. In other embodiments, M can be another alkali metal, for example Na, K, $R^b$, or Cs. In some embodiments, M can further comprise an alkaline earth metal, for example Mg, Ca, Sr, or Ba, along with the alkali metal. In further embodiments, M can further comprise a pseudo-alkaline earth ion, for example Zn, Cd, or Hg along with the alkali metal. In some embodiments, M can be a mixture of any of the aforementioned alkali metals, alkali-earth metals, or pseudo alkaline earth metals. Proper selection of M can be driven by thermodynamic and/or kinetic factors, for example electronegativity differences between M and Sn, that allow the desired alkylation (i.e., the formation of the Sn—C bond) reaction to proceed with suitable yields and purity. Other factors that can influence selection of suitable M may be physical considerations such as hazards presented by reactants/product (for example, pyrophoricity, toxicity) and physical properties of reactants/products. In any case, it has been discovered that better yields and purer products can be achieved in some circumstances by using alternative alkali metal ions in place of or in addition to lithium or by introducing alkaline earth or pseudo-alkaline earth ions in additional to lithium or other alkali metal ion. The intermediates are stable (e.g., no precipitates are formed), but due to their reactivity and consequent difficulty in isolating them, the structure of the intermediates is surmised from available measurements and review of reasonable alternatives. Therefore, the idealized formula $MSnL_3$ can be more accurately understood to be a complex intermediate mixture where M can comprise one or more metals as described above.

While not wanting to be limited by theory, it is believed that proper selection of M can be influenced by the reactivity of the alkylation reaction between the $MSnL_3$ intermediate, a nucleophile, and RX, an electrophile. For more reactive R groups, for example groups having low C—Sn bond dissociation energies and/or having high electrophilicities, the release of energy that occurs from the alkylation reaction is thought to contribute to decomposition of the Sn—C bond, resulting in poor product yield. It can therefore be desirable for M to include metals of higher electronegativity (i.e., less electropositive) in order to reduce the energy released when the electrophilic alkylhalide reacts with the nucleophilic $MSnL_3$ intermediate. Conversely, for less reactive R groups, it can be desirable to choose metals with lower electronegativities (i.e., more electropositive) to increase the yield of the desired RSn bond.

The synthesis approaches make use of tin (II) halide ($SnX_2$, such as $SnCl_2$), a secondary amine or an acetylide, an alkyl metal (MR") and an alkyl halide (RX), where R" and R are organo groups, M is an alkali metal (Li, Na, K, $R^b$, and/or Cs) and X is a halide. The secondary amine can be represented with the formula $HNR'_2$, and the acetylide by $R'C≡CH$, where R' is an organo group, i.e., a hydrocarbyl group. For embodiments in which M is a non-lithium alkali metal, it can be convenient and more efficient to introduce the alkali metal as $MOR^O$ such that the M gets incorporated into an alkali metal-tin intermediate. It has not been determined if LiR" is converted to MR" since the M can be introduced at a lower stoichiometric amount corresponding to the tin molar amounts rather than to the stoichiometry of the hydrolysable ligands. Nevertheless, the introduction of the non-lithium alkali metal can result in a more efficient overall reaction and improved yield, even though such a substitution may add to reaction complexity and adds an additional reactant. An intermediate in the synthesis is believed to be a $MSnL_3$ composition where L is $-NR'_2$ or $-C≡CR'$. This alkali metal tin compound may be a useful intermediate for the synthesis of other compounds as well.

In addition to the alkali metal in, generally lithium and an optional use of non-lithium alkali metal, it can be useful to also incorporate alkaline earth metal ions (Be, Mg, Ca, Sr, Ba) or pseudo-alkaline earth metal ions (Zn, Cd, Hg), or mixtures thereof, which for some reactions can facilitate formation of products with a higher yield and/or higher purity. These +2 metal ions can be introduced as halide salts $MX_2$, where X is a halide. Alkaline earth metals, such as magnesium, are known to form equilibrium mixtures of compositions with nucleophilic ligands, including alkyl ligands, such as in Grignard reagents. If mixed with lithium compounds bound to nucleophilic ligands, the alkaline earth metals are expected to form equilibrium compositions with the lithium compositions. Pseudo-alkaline earth metals refer to the metals of group 12 of the periodic table (zinc, cadmium, mercury) that exhibit similar chemistry to the alkaline earth metals of group 2. Zinc is exemplified below in synthesis reactions. It is contemplated that compositions form in solution, such as $Q(Sn(L_3)_2$ and $Li(Q(Sn(L_3)_3)$ where Q is an alkaline earth or pseudo-alkaline earth metal, but the precise compositions are not directly evaluated, and relatively complex equilibria may be present. While not wanting to be limited by theory, the introduction of the alkaline earth metals and/or pseudo-alkaline earth metals facilitates the subsequent formation of tin-carbon bonds by modifying the reaction pathway and/or intermediates such that the energy released during the course of the reaction facilitates Sn—C bond formation. The alkaline earth or pseudo-alkaline earth metals may or may not be added in stoichiometric amounts, but can be chosen to provide for desired nucleophilicity of the resulting $MSnL_3$ intermediate.

Monoalkyl tin compositions are commonly prepared from monoalkyl tin trichlorides produced by redistribution reactions of the type $$R_4Sn+3SnX_4 \rightarrow 4RSnX_3$$

$$R_2SnX_2+SnX_4 \rightarrow 2RSnX_3$$

where R is an alkyl group and X is a halide, commonly chloride. Langer et al. reported the formation of $CH_3SnCl_3$ from a redistribution reaction involving $(CH_3)_2SnCl_2$ and $SnCl_4$ in hot dimethylsulfoxide (DMSO). (Tetrahedron Letters, 1967, 1, 43-47; U.S. Pat. No. 3,454,610, 1969, both of which are incorporated herein by reference). DMSO forms an adduct with the monoalkyl tin product, which aids product separation and purification.

Catalysts can be used to produce monoalkyl derivatives that may otherwise be difficult or impossible to prepare. The use of phosphorus-halogen compounds as catalysts in mixtures with phosphorous pentoxide and hydrochloric acid is described, for example in U.S. Pat. No. 3,459,779 to Neumann, entitled "Process for the production of alkyltin trihalides," incorporated herein by reference. The redistribution of dialkyl tin dihalides or tetralkyl tin compositions with tin tetrahalide can also be catalyzed by quaternary ammonium salts at temperatures above 150° C. (T. G. Kugele and D. H. Parker, U.S. Pat. No. 3,862,198, "Catalyzed redistribution of alkyltin halides," incorporated herein by reference). $SnF_2$ is found to catalyze the redistribution reactions (Buschhoff and Neumann, U.S. Pat. No. 4,604,475, "Method for making organotin halides," incorporated herein by reference). Thoonen et al. in U.S. Pat. No. 6,768,017 entitled "Process for the production of monoalkyl tin trihalides," incorporated herein by reference, describe the use of transition metals to catalyze the redistribution reactions.

Boele et al. in U.S. Pat. No. 7,592,472 entitled "Process for the Preparation of Monoalkyl Tin Trihalides and Dialkyl Dihalides," incorporated herein by reference describe the reaction of an alkene, a tin dihalide, and hydrogen halide in the presence of a transition-metal catalyst to produce a monoalkyl tin trihalide. Deelman et al. in U.S. Pat. No. 8,198,352 entitled "High Purity Monoalkyltin Compounds and Uses Thereof." incorporated herein by reference, describe the purification of monoalkyl tin trichlorides and their conversion to derivative compositions by replacing chloride with mercaptoacetates.

While several methods are available to prepare monoalkyl tin compositions, their applicability is often limited by practical aspects to specific alkyl groups. Moreover, reported reactions can also produce low product yields and a plurality of mono and polyalkyl products that involve subsequent purification steps to isolate the desired compound. Retained catalyst in products can also compromise applications requiring very low concentrations of trace metals. Edson et al. in published U.S. patent application 2019/0315781A1, entitled "Monoalkyl Tin Compounds with Low Polyalkyl Contamination, Their Compositions and Methods," incorporated herein by reference, describe improved methods to synthesize monohydrocarbyl tin triamides and monohydrocarbyl tin trialkoxides. The triamides are prepared by substitution reactions between alkyl zinc or alkyl magnesium reagents and a tin tetraamide. The product triamides are then purified via fractional distillation to remove polalkyl impurities. The triamides can then converted to trialkoxides by reaction of the amide with a stoichiometric amount of an alcohol. This work involved the production of few polyalkyl impurities from the initial reactions, but fractional distillation was used to further lower the impurity levels.

Methods for the preparation of monoalkyl tin triamides have previously employed lithium reagents to convert tin tetraamides to the desired triamides. For example, t-butyl tris(diethylamido) tin, $(t-BuSn(NEt_2)_3)$, can be synthesized with a lithium reagent according to the method of Hanssgen, D.; Puff, H.; Beckerman, N. J. Organomet. Chem. 1985, 293, 191, incorporated herein by reference. These methods with lithium reagents, however, can produce a mixture of monoalkyl and dialkyl tin products. Reported methods to prepare monoalkyl tin triamides containing a secondary alkyl group produce mixtures rich in mono-, di-, and triakyl tin products.

The processes described herein focus on the synthesis of monoalkyl tin triamides and monoalkyl tin triacetylides with low polyalkyl concentrations prior to distillation. The processes can also be applied to synthesize monoalkyl tin products comprising hydrocarbyl groups that cannot be readily prepared in pure form by other methods known in the art. In the present synthesis reactions, the hydrocarbyl ligands are generated from an organohalide reactant. The organohalide reactants are readily available for a wide range of compounds to supply the ligands. While other synthesis techniques may be generally applicable for the synthesis of a range of hydrocarbyl ligands, there may be practical constraints with respect to the reactant compositions to introduce the ligands as well as yields, reaction times, selection of suitable solvents and potentially other practical constraints. The synthesis of alkali metal tin compounds provide an effective intermediate that may be useful also in other contexts.

With respect to designing improved EUV patterning compositions, it can be advantageous to tailor the hydrocarbyl ligand to comprise atoms with high EUV absorptions, such as iodine, to improve the efficiency of the patterning process. In the processes described herein the organohalide reactant can be an iodinated organohalide represented by the formula $R_IX$, wherein $R_I$ is a hydrocarbyl group (alkyl, cycloalkyl, alkenyl, alkynyl, aryl) having from 1-30 carbon atoms where at least 1 hydrogen atom is substituted with an iodine atom. X is a halide, including iodide, chloride, and bromide. In some embodiments, other halide groups can be similarly introduced as an alternative to the iodinated groups, so $R_I$ can also be considered to have other halides to replace the iodine. In general, the reactant is provided with a plurality of halide atoms, since one is replaced by nucleophilic substitution to form the tin-carbon bond while other halides then remain in the halogenated ligand. When the halides are not equivalent, the C atom that is directed bonded to the halide will have a different electrophilicity depending on the halide identity, so in this way it is possible to direct the reaction to the correct product by making sure the appropriate halide is on the desired carbon. Generally, with a smaller halide, the C is more electrophilic, but there are always other considerations. Generally, the reaction can be highly selective to add to the more electrophilic carbon $R_1$ can have other heteroatom substitutions also, as appropriate, such as N, O, P. S, or other halide atoms. Non-limiting examples of iodinated organohalide reactants include 2,2-diiodopropane and 3-iodobenzylbromide. Other contemplated iodinated organohalide reactants have 2 or 3 or more iodine atoms in the hydrocarbyl group. Fully iodinated aryl halides are also contemplated. Iodinated organohalide reactants can be applied to synthesize mono-alkyl tin triamide and acetylide products comprising iodinated hydrocarbyl ligands. Iodinanted hydrocarbyl tin trialkoxides can further be formed as described for non-iodinated hydrocarbyl tin trialkoxides herein. For the purposes of the disclosure, reactions involving an RX or a $RSnL_3$ compound are taken to be interchangeable with an $R_fX$ or $RISnL_3$ compound. In some desirable embodiments, the halogenated ligands have a structure represented by the formula $R^1R^2XC$—, where $R'$ and $R^2$ are independently H or any other organic moieties consistent with the broad definition of R above with the proviso that both R and $R'$ are not H, and X is a halide, F. Cl. Br or I. Thus, in these compounds, the halogen atom is directly bonded to the carbon forming the tin bond. Following completion of the synthesis, the product compound with optional hydrolysis and/or condensation can be represented by the formula $R^1R^2XCSnZ_3$, where Z is L, where L is a hydrolysable ligand, or $O_x$ $(OH)_{3-x}$, $0<x<3$. In other desirable embodiments, the halogenated ligands are represented by the formula $AR^1R^2C$—, where A is an aromatic ring with at least one halogen substituent, $R^1$ and $R^2$ are independently H or any other organic moieties consistent with the broad definition of R above. A can be $C_6H_4X$, $C_6H_3X_2$, $C_6X_5$, or any other reasonable aromatic ring, where X is a halide, F, Cl, Br or I. Following completion of the synthesis, the product compound with optional hydrolysis and/or condensation can be represented by the formula $AR^1R^2CSnZ_3$, and Z is L, where L is a hydrolysable ligand or $O_x$ $(OH)_{3-x}$, $0<x<3$. In particular, iodine has a large EUV absorption. Although other halogens have a less pronounced EUV absorption, they may still be advantageous to replace hydrogen due to hydrogen having an insignificant EUV absorption.

Exemplified precursor compounds also include R groups with cyano (also referred to as nitrile) groups or ether groups. The cyano compounds can have the formula $R'R''$ $(N≡C)$ $CSnZ_3$ where $R'$ and $R''$ are independently hydrocarbyl groups having from 1 to 15 carbon atoms and optional unsaturated carbon-carbon bonds, optional aromatic groups and optional hetero atoms, and Z is L, where L is a hydrolysable ligand, or $O_x$ $(OH)_{3-x}$, $0<x<3$. In some embodiments, $R'$ and $R''$ are the same and $R'$ is a linear or branched alkyl (—$C_nH_{2n+1}$, n is 1 to 5). The compounds with ether groups can have the formula $R'R''$ $(R'''O)$ $CSnZ_3$ where $R'$, $R''$ and $R'''$ are independently H or hydrocarbyl groups having from 1 to 15 carbon atoms and optional unsaturated carbon-carbon bonds, optional aromatic groups and optional hetero atoms, and Z is L, where L is a hydrolysable ligand, or $O_x$ $(OH)_{3-x}$, $0<x<3$.

While the overall synthesis can be considered as two overall steps, more generally the present synthesis can be considered a multi-step process, although the number of steps can be subjective in that intermediates generally are not isolated and purified. While not wanting to be limited by theory, conceptually it can be useful to consider the overall synthetic process to comprise two steps in which the first step involves formation of four coordinated tin with three amide/acetylide ligands and a metal-tin bond (metal being alkali metal and/or alkaline earth/pseudo-alkaline earth metal), which may have both ionic and covalent character, although the concept is not limited by the theory of the structure. In the second step, the metal-tin interaction is replaced with a hydrocarbyl ligand to the tin involving an $sp^3$ or $sp^2$ carbon-tin bond. The overall reaction involves an oxidation of the tin (II) to tin (IV) with corresponding exchange of two halide ligands for three amide/acetylide ligands and a carbon-tin bond. The first step of forming the metal tin triamide/acetylide can be generally conceptually divided into multiple steps depending on the particular starting materials.

As exemplified, monohydrocarbyl tin triamides and monohydrocarbyl tin triacetylides can be prepared by the following overall reactions:

$$3HNR'_2+3MR''(+M'Z)+SnX_2+RX→RSn(NR'_2)_3+\text{byproducts,}$$

or $$3R'CCH+3MR''(+M'Z)+SnX_2+RX→RSn(CCR')_3+\text{byproducts.} \qquad (1)$$

In these reactions, M generally is lithium, but lithium can be replaced with other alkali metals, i.e., sodium, potassium, rubidium and cesium. The parenthetical M'Z represents optional reactants M"OR" or M"$X_2$, where M" is an alkali metal ion, OR" is an alkoxide that remains passive, and M" is an alkaline earth/pseudo-alkaline earth metal ion provides as the halide with X being a halide ion. From a practical perspective for some target products, the reactions achieve better yields and rates for the reactions if alkali metal alkoxides $(MOR^O)$ are added to the first step of the reactions In addition, desirable reactants are more readily available for such processing. Nevertheless, for some organo ligands, better yields can be obtained with the introduction of the non-lithium alkali metal compounds. Thus, further exemplified embodiments involving potassium have the following overall reactions:

$$3HNR'_2+3LiR''+KOR^O+SnX_2+RX→RSn(NR'_2)_3+\text{byproducts,}$$

or $$3R'CCH+3LiR''+KOR^O+SnX_2+RX→RSn(CCR')_3+\text{byproducts,} \qquad (2)$$

In the reactions represented by these equations, potassium (K) can be replaced with other non-Li alkali metal ions. Example 7 describes the synthesis of an iodinated alkyltin triamide represented by the formula $(CH_3)_2ICSn(N(CH_2)_2)_3$ via a reaction according to reaction (2). The synthesis involves both n-butyl lithium and potassium tert-butoxide and an iodinated alkylhalide. Example 8 describes the synthesis of an iodinated aryltin triacetylide represented by the $(C_6HsI)CH_2Sn(CCSi(CH_3)_3)$ via a reaction according to reaction (2). The synthesis involves both n-butyl lithium and potassium tert-butoxide and an iodinated arylhalide. In reactions (1) and (2), X is a halide and R" generally is a hydrocarbyl group with ≤10 carbon atoms. R" becomes incorporated into a by-product, generally HR", so its identity is generally not particularly limited or significant, and it can be selected for general availability, low cost, case of removal of the by-product, and good reactivity. The R' groups provide the substituents for the corresponding ligands of the product compositions. In Eq. (2), the potassium can be introduced in a stoichiometric amount relative to the tin for the formation of a potassium tin composition rather than a stoichiometric amount for the introduction of the amide ligands, which is the circumstance for the lithium in this reaction. In additional or alternative embodiments, $KOR^O$ can be replaced by or supplemented with M"$X_2$, such as $ZnCl_2$, where M" is an alkaline earth metal ion or a pseudo-alkaline earth metal ion.

In some embodiments it can be beneficial to perform the above reactions in the presence of suitable additives such as tris(2-aminoethyl)amine (TREN) as described by Edson et al in published U.S. patent application 2019/0315781 (hereinafter the '781 application), entitled "Monoalykyl Tin Compounds with Low Polyalkyl Contamination, Their Compositions and Methods", incorporated herein by reference. Such additives can improve the purity of a product, lower the activation energy of a reaction step, catalyze a reaction step, and the like. The above reactions can be carried out in suitable solvents chosen for various properties, such as solvation of appropriate reactants and products, toxicity, flammability, and such. After the preparation of the improved photosensitive composition, further purification of the composition can be performed if desired. In some embodiments, fractional distillation methods can be effectively used, as described in the '781 application.

The RX organohalide compounds are selected to provide the desired organo ligands for the mono-organo tin products. The wide availability of RX compounds as reactants as well as the broad reactivity of the compounds in the corresponding reactions provides an ability to introduce a wide range of organo ligands into the product mono-organo tin products with practical yields and reasonable reaction times. The versatility is demonstrated to some degree by the exemplified products.

As described further in the following, the overall reaction can be considered as the result of two or more sequential reactions, although generally no isolation or purifications of intermediates is performed. The first reaction involves the synthesis of the alkali metal amide or alkali metal acetylide, such as lithium amide or the lithium acetylide. While lithium amides and lithium acetylides are known compounds, and some may be available commercially in some form, these compounds are highly reactive and pyrophoric, so their in-situ synthesis as part of the overall reaction is convenient and advantageous. With respect to non-lithium alkali metal amides or non-lithium alkali metal acetylides, these can be similarly synthesized. In some embodiments, though, the non-lithium alkali metal can be introduced in a stoichiometric amount similar to the tin rather than three times this amount corresponding to the amide/acetylide ligands. The non-lithium metal ions can be more conveniently provided as alkali metal alkoxide compounds, which are more readily available than other alkali metal precursor compounds, and/or alkaline earth/pseudo-alkaline earth dihalides. Tin dihalide, such as tin dichloride, reacts with the alkali metal amide to form an alkali metal tin triamide or alkali metal tin triacetylide.

Presently, the isolation of the alkali metal tin triamides or alkali metal tin triacetylides have not been accomplished. The improved synthesis techniques are not contingent on the precise identity of the intermediates, and the general discussion herein focuses on the overall starting materials and the ultimate products that can be isolated and characterized. Nevertheless, the postulated identity of the intermediates is based on strong suppositions that follow from the species present. In the particular solvents used, metal ions are not expected to be well solvated. Yet, the compositions remain in solution, so large cluster formation and gelation is not observed. While not wanting to be limited by theory, organometallic reagents, for example alkyllithium, alkylmagnesium (Grignard reagent), and potassium tert-butoxide are known to form clusters, such as tetramers, hexamers, and cubanes, having metal-metal bonds, and it is therefore reasonable that similar species are formed in solution in possibly complex equilibrium mixtures that so far defy characterization. The relative stabilities of the known species then suggests what intermediate species can be expected to be present, but the precise structural characterization is not needed to understand their basic chemical involvement in the reactions. The reactivity of species would be consistent with the inability to remove the solvent to isolate the species.

While the overall reactions are presented above, these reactions are performed in multiple steps. Since one of the reactants is tin dihalide, such as tin dichloride, a consideration for solvent selection involves appropriate solubility of tin dihalide. The other initial reactants such as the dihydrocarbyl amine and the monoalkyl lithium (or generally the monoalkyl alkali metal), can be soluble in different solvents. The reactions are generally performed in dry organic solvents under an oxygen free or depleted atmosphere, such as a nitrogen purged atmosphere. Solvents can be selected to result in the solubility of the various components. Due to interactions of the solvent with the metal ions, selection of solvents can be based at least in part on reaction rates in the selected solvents, which can be evaluated empirically. If different solvents are selected, they are generally miscible. Aprotic polar solvents are generally useful, such as ethers (for example, dimethyl ether, diethyl ether), tetrahydrofuran (THF), acetone and mixtures thereof. The solvents should generally be selected to be inert with respect to the reactants, intermediates and products. If multiple solvents are used, for example to introduce distinct reactants, the solvents should generally be miscible with respect to each other. The first reaction can be considered the synthesis of a $MSnL_3$ intermediate, where L is dialkyl amide (dihydrocarbylamide) or alkyl acetylide (hydrocarbyl acetylide), although the particular structure has not been verified. From the reactants and reaction conditions, evidence does suggest formation of tin-ligand bonds, so the presence of the moiety $SnL_3$ seems likely, and the metal cations seem likely to be associated with the tin moieties for stabilization, but the particular structures may be present in complex equilibrium mixtures. This first reaction can be considered two separate reactions, if desired, with a first subreaction directed to the formation of a metal ligand composition (ML) and the subsequent subreaction with $SnCl_2$ or other tin dihalide. As described in detail, M can be an alkali metal, and alkaline earth metal and/or a pseudo-alkaline earth metal. In general, for the first reaction, the solutions are cooled, generally to less than 10° C. and in some embodiments 0° C., which can be a convenient temperature for use of an ice bath, although for non-aqueous solutions there is nothing special about this temperature. Cooling allows for desired control of the reaction while maintaining reasonable reaction rates. The first subreaction can be performed for as long as is practical and is not particularly limited. The first subreaction can be allowed to continue for at least about 30 seconds, in other embodiments at least about 2 minutes, in some embodiments 1 minute to 5 hours and in some embodiments from about two minutes to about 3 hours. In some embodiments, the two subreactions can be combined and proceed essentially as a single reaction, which is effectively zero time for the first subreaction or short times for the first subreaction. If a non-lithium alkali metal alkoxide and/or an alkaline earth (or pseudo-alkaline earth)dihalide is introduced as a reactant, this compound can be added conceptually as part of the first subreaction or the second subreaction or potentially in the context of a third subreaction between the first subreaction and the second subreaction. A person of ordinary skill in the art will recognize that additional ranges of time and temperature within the explicit ranges above are contemplated and are within the present disclosure.

Generally, the alkyl lithium reactant and the amine/acetylene reactant are in rough stoichiometric amounts, although generally a small to moderate excess of the amine/acetylene reactant is used, such as from about 1 mole percent (mol %) to about 50 mol % amine/acetylene reactant can be used. Similar stoichiometric amounts or ligand precursors (dialkylamine or alkylacetylene) can be used if a non-lithium alkyl alkali metal compound is used. Generally, it is desirable to have ML compositions in a 3:1 ratio relative to the molar amount of Sn to add three ligands for each tin. If a non-lithium metal alkoxy alkali metal compound is used along with alkyl lithium, the alkyl lithium can have an amount based on molar equivalents for the amine/acetylene reactant, while the non-alkali metal compound can have a molar amount equivalent to the tin compound to be added, although greater amounts of the metal (alkali metal or alkaline earth metal or pseudo-alkaline earth metal) can be used if desired, as long as additional amounts of ML are not formed. The tin reactant can be added, for corresponding embodiments, in an approximate molar equivalent (1:3) for the ML ligand contributing reactant to form three ligand tin bonds for each tin atom. The low amounts of contaminants form tin product with 1, 2 or 4 ligands confirms the effectiveness of controlling the molar ratios of tin to ML reactants. The metal concentrations in the reactant solutions are generally from about 0.025M to about 2M, and in further embodiments form about 0.5 to about 1.5M. A person of ordinary skill in the art will recognize that concentration range and allowed stoichiometric ratios within the explicit ranges above are contemplated and are within the present disclosure.

The second reaction involves the introduction of a carbon-tin bond along with the formation of the organo ligand bound to the tin. The carbon-tin bond conceptually replaces an metal-tin bond, the metal being an alkali metal, alkaline earth metal, and/or pseudo-alkaline earth metal. The organo ligand to be bonded to the tin results from a reaction with an organohalide, RX. Generally, at least about a stoichiometric amount of organohalide is introduced for forming the carbon-tin bond, but an excess of the organohalide can be introduced. In some embodiments, up to a three-fold molar excess of the organohalide can be used in the reaction and in further embodiments from about 1 to about 2 molar equivalents of RX relative to moles of Sn can be used. The solvents can be the same or selected from the same available solvents and mixtures thereof as used for the first reaction. The products of the first reaction are generally not purified prior to performing the second reaction, although byproducts could be removed if convenient. The metal concentrations generally are similar to the concentrations of the first reaction step, although usually slightly smaller due to dilution. To account for the exothermic nature of the reaction, the second reaction can be generally, but not necessarily, started at a low temperature, such as about 0° C. or more generally about −78.5° C. to about 10° C., although in some embodiments, the reactants can be combined at room temperature. After mixing the reactants for the second reaction, the reaction can be allowed to continue at the same temperature or allowed to gradually warm to a temperature from about 20° C. to about 50° C. or room temperature (20-24° C.). The reaction can run for at least about 15 minutes, in some embodiments from about 15 minutes to about 24 hours, and in some embodiments from about 30 minutes to about 15 hours, although longer reaction times can be used, if desired. A person of ordinary skill in the art will recognize that additional ranges of concentration, molar ratios, temperatures and times give above for the second reaction are contemplated and are within the present disclosure.

Due to the exothermic nature of the reactions described herein, it can be beneficial to modify various parameters of the synthesis such as amounts of reactants, reaction temperatures, reagent addition times, reaction times, and the like. Such considerations are known by those of ordinary skill in the art. A useful analytical technique for analyzing the reactions and informing practitioners of suitable process conditions is reaction calorimetry. calorimetric data can provide useful thermodynamic variables for a given reaction. In particular, scale-dependent variables (e.g., heats of enthalpy) can be measured for a desired reaction and used to properly conduct the reaction at larger scale. In this way, process variables can be suitably controlled for reactions at different scales. Reaction calorimetric data is included in some of the examples below. Within the guidelines presented above along with the guidance of the examples blow, a person of ordinary skill in the art will recognize that specific parameters for a particular reaction can be adjusted to provide desired results. Optimization using routine experimentation can be performed by a person of ordinary skill based on these teachings for a wide range of product compositions. The reactions exemplified result in good yields and a high specificity for the product compositions.

Once the product is formed, the organo tin tri (dihydrocarbylamides/hydrocarbyl acetylides) can be purified. The purification depends on the nature of the product, but generally involves the separation of the desired product from by products and potentially any unreacted reagents. Purification can generally be achieved by methods known in the art. Typical means of purification can comprise filtration, recrystallization, extraction, distillation, combinations thereof, and the like. Filtration is typically performed on a crude product mixture to remove insoluble contaminants and/or by products, for example, metal halide salts such as LiCl, from the solution containing the desired product. Recrystallization methods can be useful to purify solid compounds by forming, via heating, a saturated solution that then is allowed to cool. Extraction techniques can comprise, for example, liquid-liquid extractions wherein two non-miscible solvents with different densities are used to separate the desired compounds based on their relative solubilities. Purification can also comprise removal of any volatile compounds including solvents from the product mixture by drying or exposure to vacuum. For products with significant vapor pressures, it can be desirable to purify the product through vacuum distillation or, if desired, fractional distillation designed to achieve high purity. See published U.S. patent application 2020/0241413 to Clark et al., entitled "Monoalkyl Tin Trialkoxides and/or Monoalkyl Tin Triamides With Low Metal Contamination and/or Particulate Contamination and Corresponding Methods," incorporated herein by reference. Products can be also reacted to form derivatives, such as organo tin trialkoxides, which can be further purified by the techniques above and other means known in the art.

The organotin precursor compositions described herein can be effectively used for radiation patterning, especially EUV patterning. The ability to have greater flexibility for ligand selection allows for further improvements in patterning results as well as designing ligands to be particularly effective for specific applications. In general, any suitable coating process can be used to deliver the precursor solution to a substrate. Suitable coating approaches can include, for example, solution deposition techniques such as spin coating, spray coating, dip coating, knife edge coating, printing, such as inkjet printing and screen printing, and the like. Many of the precursors are also suitable for vapor deposition onto a substrate as discussed in the '618 patent cited above. For some R ligand compositions and/or specific process considerations, vapor deposition may be useful for preparation of radiation sensitive coatings.

For use in solution-deposited patterning compositions, it can be desirable to convert the product to an organo tin trialkoxide. This reaction is generally performed following purification with distillation through a reaction with a corresponding alcohol. An additional solvent may or may not be used. To better control the reaction, the reaction may be initially cooled, such as to ice bath temperature, and then allowed to warm to room temperature. The product organo tin trialkoxide generally is an oil that can be purified through distillation. These steps are outlined in the following examples. Conversion of the precursor compositions to trialkoxides is not required to form a coating precursor, but organotin trialkoxides can be convenient precursors for deposition because of the benign volatile products, e.g., alcohols, after hydrolysis and coating formation.

After preparation of the desired organotin precursor, the precursor can be dissolved in an appropriate solvent to prepare a precursor solution, such as an organic solvent, e.g., alcohols, aromatic and aliphatic hydrocarbons, esters or combinations thereof. In particular, suitable solvents include, for example, aromatic compounds (e.g., xylenes, toluene), ethers (anisole, tetrahydrofuran), esters (propylene glycol monomethyl ether acetate, ethyl acetate, ethyl lactate), alcohols (e.g., 4-methyl-2-pentanol, 1-butanol, methanol, isopropyl alcohol, 1-propanol), ketones (e.g., methyl ethyl ketone), mixtures thereof, and the like. In general, organic solvent selection can be influenced by solubility parameters, volatility, flammability, toxicity, viscosity and potential chemical interactions with other processing materials. After the components of the solution are dissolved and combined, the character of the species may change as a result of partial in-situ hydrolysis, hydration, and/or condensation.

The organotin precursors can be dissolved in the solvent at concentrations to afford concentrations of Sn suitable for forming coatings of appropriate thickness for processing. The concentrations of the species in the precursor solutions can be selected to achieve desired physical properties of the solution. In particular, lower concentrations overall can result in desirable properties of the solution for certain coating approaches, such as spin coating, that can achieve thinner coatings using reasonable coating parameters. It can be desirable to use thinner coatings to achieve ultrafine patterning as well as to reduce material costs. In general, the concentration can be selected to be appropriate for the selected coating approach. Coating properties are described further below. In general, tin concentrations comprise from about 0.005M to about 1.4M, in further embodiments from about 0.02 M to about 1.2 M, and in additional embodiments from about 0.1 M to about 1.0 M. A person of ordinary skill in the art will recognize that additional ranges of tin concentrations within the explicit ranges above are contemplated and are within the present disclosure.

In some embodiments, improved photosensitive precursor compositions can be present in a blended solution with one or more organotin compositions, such as $R_nSnX_{4-n}$ and its hydrolysates, where R is chosen from the various moieties described in detail herein and elaborated on explicitly above. Such blended solutions can be tuned for optimization of various performance considerations, such as solution stability, coating uniformity, and patterning performance. In some embodiments, the improved photosensitive composition can comprise at least 1% by mol. Sn of a desired component in the blended solution, in further embodiments at least 10% by mol. Sn of the blended solution, in further embodiments at least 20% by mol. Sn of the blended solution, and in further embodiments at least 50% by mol. Sn of a specific desired component of the blended solution. Additional ranges of mol % of the improved photosensitive composition within the explicit ranges of the blended solution are contemplated and within the present disclosure.

Owing generally to their high vapor pressures, the organotin compositions described herein can be useful as precursors for forming coatings via vapor deposition. Vapor deposition methods generally include chemical vapor deposition (CVD), physical vapor deposition (PVD), atomic layer deposition (ALD), and modifications thereof. In a typical vapor deposition process, the organotin composition can be reacted with small molecule gas-phase reagents such as $H_2O$, $O_2$, $H_2O_2$, $O_3$, $CH_3OH$, $HCOOH$, $CH_3COOH$, and the like, which serve as O and H sources for production of radiation sensitive organotin oxide and oxide hydroxide coatings. Vapor deposition of radiation patternable organotin coatings has been described by Wu et. al in PCT Application #PCT/US2019/031618 entitled "Methods for Making EUV Patternable Hard Masks", incorporated herein by reference. Production of radiation sensitive organotin coatings can generally be achieved by reacting the volatile organotin precursor $RSnL_3$ with a small gas-phase molecule. The reactions can include hydrolysis/condensation of the organotin precursor to hydrolyze the hydrolysable ligands while leaving the Sn—C bonds substantially intact.

With respect to an outline of a representative process for a radiation based patterning, e.g., an extreme ultraviolet (EUV) lithographic process, photoresist material is deposited or coated as a thin film on a substrate, pre-exposure baked, exposed with a pattern of radiation to create a latent image, post-exposure baked, and then developed with a liquid, typically an organic solvent, to produce a developed pattern of the resist. Fewer steps can be used if desired, and additional steps can be used to remove residue to improve pattern fidelity.

The thickness of the radiation patternable coating can depend on the desired process. For use in single-patterning EUV lithography, coating thicknesses are generally chosen to yield patterns with low defectivity and reproducibility of the patterning. In some embodiments, suitable coating thickness can from between 0.1 nm and 100 nm, in further embodiments from about 1 nm to 50 nm, and in further embodiments from about 2 nm to 25 nm. Those of ordinary skill in the art will understand that additional ranges of coating thickness are contemplated and are within the present disclosure.

Coating thickness for radiation patternable coatings prepared by vapor deposition techniques can generally be controlled through appropriate selection of reaction time or cycles of the process. The thickness of the radiation patternable coating can depend on the desired process. For use in single-patterning EUV lithography, coating thicknesses are generally chosen to yield patterns with low defectivity and reproducibility of the patterning. In some embodiments, suitable coating thickness can from between 0.1 nm and 100 nm, in further embodiments from about 1 nm to 50 nm, and in further embodiments from about 2 nm to 25 nm. Those of ordinary skill in the art will understand that additional ranges of coating thickness are contemplated and are within the present disclosure.

The substrate generally presents a surface onto which the coating material can be deposited, and it may comprise a plurality of layers in which the surface relates to an upper most layer. The substrate is not particularly limited and can comprise any reasonable material such as silicon, silica, other inorganic materials, such as ceramics, and polymer materials.

After deposition and formation of the radiation pattern-able coating, further processing can be employed prior to exposure with radiation. In some embodiments, the coating can be heated from between 30° C. and 300° C., in further embodiments from between 50° C. and 200° C. and in further embodiments from between 80° C. and 150° C. The heating can be performed, in some embodiments for about 10 seconds to about 10 minutes, in further embodiments from about 30 seconds to about 5 minutes, and in further embodiments from about 45 seconds to about 2 minutes. Additional ranges for temperatures and heating durations within the above explicit ranges are anticipated and envisioned.

Patterning of the Compositions:

Radiation generally can be directed to the coated substrate through a mask or a radiation beam can be controllably scanned across the substrate. In general, the radiation can comprise electromagnetic radiation, an electron-beam (beta radiation), or other suitable radiation. In general, electromagnetic radiation can have a desired wavelength or range of wavelengths, such as visible radiation, ultraviolet radiation, or X-ray radiation. The resolution achievable for the radiation pattern is generally dependent on the radiation wavelength, and a higher resolution pattern generally can be achieved with shorter wavelength radiation. Thus, it can be desirable to use ultraviolet light, X-ray radiation, or an electron-beam to achieve particularly high-resolution patterns.

Following International Standard ISO 21348 (2007) incorporated herein by reference, ultraviolet light extends between wavelengths of greater than or equal to 100 nm and less than 400 nm. A krypton fluoride laser can be used as a source for 248 nm ultraviolet light. The ultraviolet range can be subdivided in several ways under accepted Standards, such as extreme ultraviolet (EUV) from greater than or equal 10 nm to less than 121 nm and far ultraviolet (FUV) from greater than or equal to 122 nm to less than 200 nm. A 193 nm line from an argon fluoride laser can be used as a radiation source in the FUV. EUV light at 13.5 nm has been used for lithography, and this light is generated from a Xe or Sn plasma source excited using high energy lasers or discharge pulses. Soft x-rays can be defined from greater than or equal to 0.1 nm to 5-less than 10 nm.

Based on the design of the coating material, there can be a large contrast of material properties between the irradiated regions that have condensed coating material and the unir-radiated, coating material with substantially intact Sn—C bonds. For embodiments in which a post irradiation heat treatment is used, the post-irradiation heat treatment can be performed at temperatures from about 45° C. to about 250° C., in additional embodiments from about 50° C. to about 190° C. and in further embodiments from about 60° C. to about 175° C. The post exposure heating can generally be performed for at least about 0.1 minute, in further embodiments from about 0.5 minutes to about 30 minutes and in additional embodiments from about 0.75 minutes to about 10 minutes. A person of ordinary skill in the art will recognize that additional ranges of post-irradiation heating temperature and times within the explicit ranges above are contemplated and are within the present disclosure. This high contrast in material properties further facilitates the formation of high-resolution lines with smooth edges in the pattern following development as described in the following section.

For the negative tone imaging, the developer can be an organic solvent, such as the solvents used to form the precursor solutions. In general, developer selection can be influenced by solubility parameters with respect to the coating material, both irradiated and non-irradiated, as well as developer volatility, flammability, toxicity, viscosity and potential chemical interactions with other process material. In particular, suitable developers include, for example, alcohols (e.g., 4-methyl-2-pentanol, 1-butanol, isopropanol, 1-propanol, methanol), ethyl lactate, ethers (e.g., tetrahydrofuran, dioxane, anisole), ketones (pentanone, hexanone, 2-heptanone, octanone) and the like. The development can be performed for about 5 seconds to about 30 minutes, in further embodiments from about 8 seconds to about 15 minutes and in additional embodiments from about 10 seconds to about 10 minutes. A person of ordinary skill in the art will recognize that additional ranges within the explicit ranges above are contemplated and are within the present disclosure. In addition to the primary developer composition, the developer can comprise additional compositions to facilitate the development process. Suitable additives may include, for example, viscosity modifiers, solubilization aids, or other processing aides. If the optional additives are present, the developer can comprise no more than about 10 weight percent additive and in further embodiments no more than about 5 weight percent additive. A person of ordinary skill in the art will recognize that additional ranges of additive concentrations within the explicit ranges above are contemplated and are within the present disclosure.

With a weaker developer, e.g., diluted organic developer or compositions in which the coating has a lower development rate, a higher temperature development process can be used to increase the rate of the process. With a stronger developer, the temperature of the development process can be lower to reduce the rate and/or control the kinetics of the development. In general, the temperature of the development can be adjusted between the appropriate values consistent with the volatility of the solvents. Additionally, developer with dissolved coating material near the developer-coating interface can be dispersed with ultrasonication during development. The developer can be applied to the patterned coating material using any reasonable approach. For example, the developer can be sprayed onto the patterned coating material. Also, spin coating can be used. For automated processing, a puddle method can be used involving the pouring of the developer onto the coating material in a stationary format. If desired spin rinsing and/or drying can be used to complete the development process. Suitable rinsing solutions include, for example, ultrapure water, aqueous tetraalkyl ammonium hydroxide, methyl alcohol, ethyl alcohol, propyl alcohol and combinations thereof. After the image is developed, the coating material is disposed on the substrate as a pattern.

In some embodiments, a solventless (dry) development process may be conducted through the use of an appropriate thermal development or plasma development process, such as those described by Tan et. al in PCT Pat App. No: PCT/US2020/039615 entitled "Photoresist Development With Halide Chemistries", incorporated herein by reference. For organotin photoresist coatings, dry development can be conducted through the use of halogen-containing plasmas and gases, for example HBr and BCl$_3$. In some cases, dry development may offer advantages over wet development such as reduced pattern collapse, deceased scum, and fine control over developer compositions, i.e. the plasma and/or etch gases.

After completion of the development step, the coating materials can be heat treated to further condense the material and to further dehydrate, densify, or remove residual developer from the material. This heat treatment can be particularly desirable for embodiments in which the oxide coating material is incorporated into the ultimate device, although it may be desirable to perform the heat treatment for some embodiments in which the coating material is used as a resist and ultimately removed if the stabilization of the coating material is desirable to facilitate further patterning. In particular, the bake of the patterned coating material can be performed under conditions in which the patterned coating material exhibits desired levels of etch selectivity. In some embodiments, the patterned coating material can be heated to a temperature from about 100° C. to about 600° C., in further embodiments from about 175° C. to about 500° C. and in additional embodiments from about 200° C. to about 400° C. The heating can be performed for at least about 1 minute, in other embodiment for about 2 minutes to about 1 hour, in further embodiments from about 2.5 minutes to about 25 minutes. The heating may be performed in air, vacuum, or an inert gas ambient, such as Ar or $N_2$. A person of ordinary skill in the art will recognize that additional ranges of temperatures and time for the heat treatment within the explicit ranges above are contemplated and are within the present disclosure. Likewise, non-thermal treatments, including blanket UV exposure, or exposure to an oxidizing plasma such as $O_2$ may also be employed for similar purposes.

EXAMPLES

The following examples present the synthesis and NMR characterization of monoalkyl tin triamide, triacetylide, and trialkoxide products having low polyalkyl contamination. The following reaction calorimetric data is presented in some examples:

Maximum Achievable Temperature: MAT (° C.)
Heat of Reaction: $\Delta H_r$ (kJ/mol)
Thermal conversion %: TC(%)

Example 1. Preparation of $CH_3CH_2CH_2Sn(N(CH_2CH_3)_2)_3$ and $CH_3CH_2CH_2Sn(OC(CH_3)_2CH_2CH_3)_3$ This example presents the synthesis of an n-propyl tin triamide, $CH_3CH_2CH_2Sn(N(CH_2CH_3)_2)_3$, abbreviated as n-PrSn(NEt$_2$)$_3$, via an oxidative stannylation reaction involving $SnCl_2$, diethylamine, n-butyl lithium, and n-propyl iodide and its subsequent conversion to an n-propyl tin trialkoxide, $CH_3CH_2CH_2Sn(OC(CH_3)_2CH_2CH_3)_3$, abbreviated as n-PrSn(O-tAm)$_3$.

(a) Synthesis of $CH_3CH_2CH_2Sn(N(CH_2CH_3)_2)_3$

Diethylamine (175 mmol, Aldrich) and anhydrous diethyl ether (53 ml, Aldrich) were mixed under positive $N_2$ (g) pressure with an $N_2$ flow in a 400-mL reactor equipped with a bubbler outlet. The reactor was cooled to 0° C. followed by dropwise addition of 150 mmol of n-butyl lithium (Aldrich, 1.6 M in hexanes). After stirring for 30 minutes, an intermediate product, LiNEt$_2$, was formed and a duplicate sample was used for characterization. Then $SnCl_2$ (50 ml, 1 M, Fisher) in tetrahydrofuran was added to the solution dropwise. The reactor was warmed to 18° C. and stirred for 30 minutes. Intermediate product, LiSn(NEt$_2$)$_3$, was formed and a duplicate sample was used for characterization. The solution was again cooled to 0° C. followed by dropwise addition of n-propyl iodide (75 mmol, Oakwood). The solution was warmed to 18° C. and stirred overnight. Volatile components of the solution were then removed under vacuum. Anhydrous pentane (200 ml, Aldrich) was added to the flask and the mixture was filtered through Celite® S (Aldrich). Another 200 mL of anhydrous pentane was used to wash the flask and the mixture was also filtered. The filtrate was concentrated to remove volatile components before being purified via vacuum distillation (250 mTorr, 70-76° C.) to yield n-propyl tin tris(diethylamide), n-PrSn (NEt$_2$)$_3$, as a colorless liquid in 65.4% yield.

Reaction calorimetry was performed to evaluate maximum achievable temperature (MAT), heat of reaction ($\Delta H_r$), and thermal conversion (TC) for each reaction type. TC corresponds to the relative amount of total heat evolved during reagent addition alone.

| | MAT (° C.) | $\Delta H_r$ (kJ/mol) | TC (%) |
|---|---|---|---|
| 1. HNEt$_2$ + n-BuLi → LiNEt$_2$ | 118 | −118 | 99 |
| 2. LiNEt$_2$ + SnCl$_2$ → LiSn(NEt$_2$)$_3$ | 37 | −216 | 89 |
| 3. LiSn(NEt$_2$)$_3$ + n-PrI → n-PrSn(NEt$_2$)$_3$ | 23 | −94 | 7 |

Figure 2:
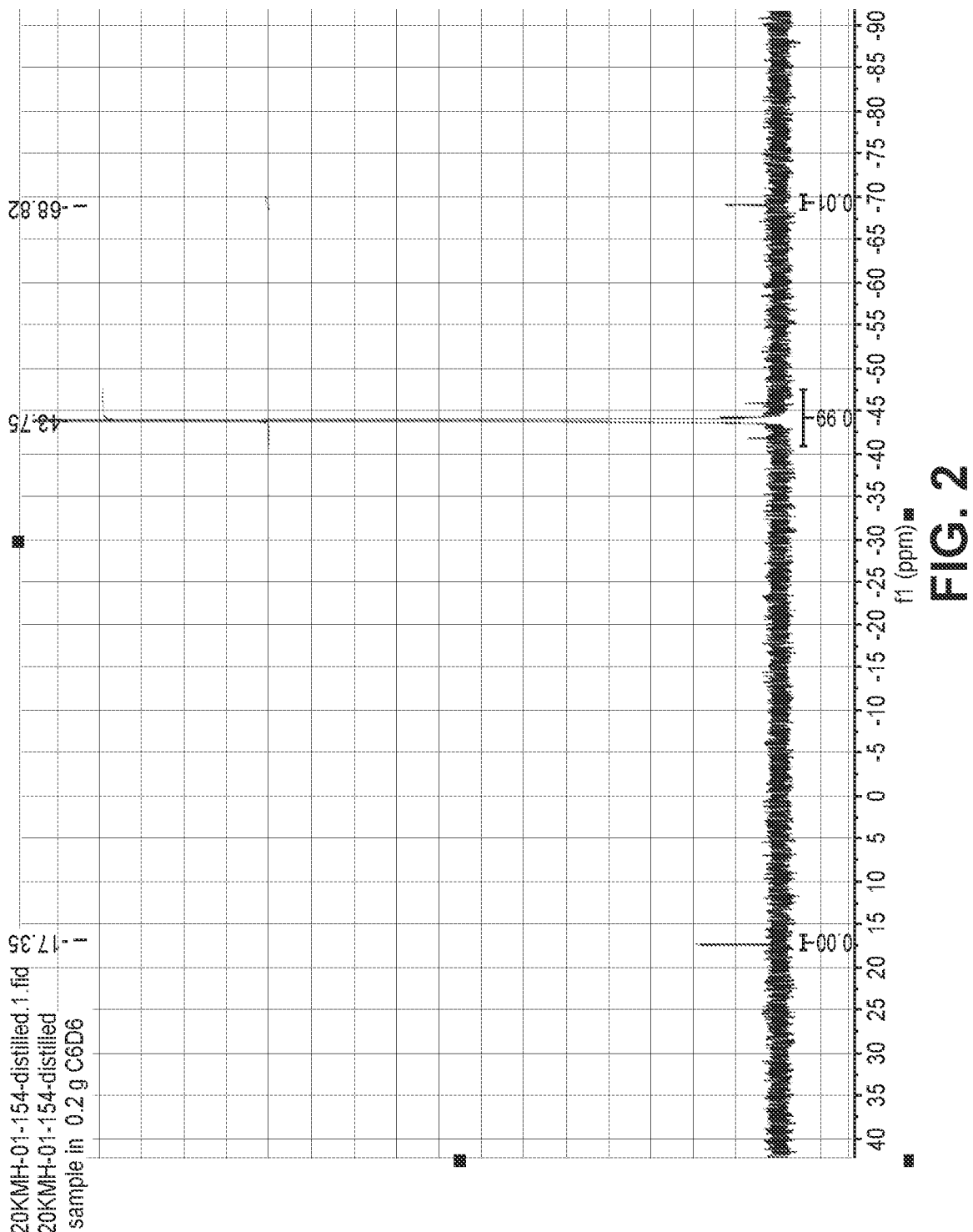
FIG. 2 is a $^{119}Sn$ NMR spectrum of n-$PrSn(NEt_2)_3$ in benzene-$d_6$.
Figure 3:
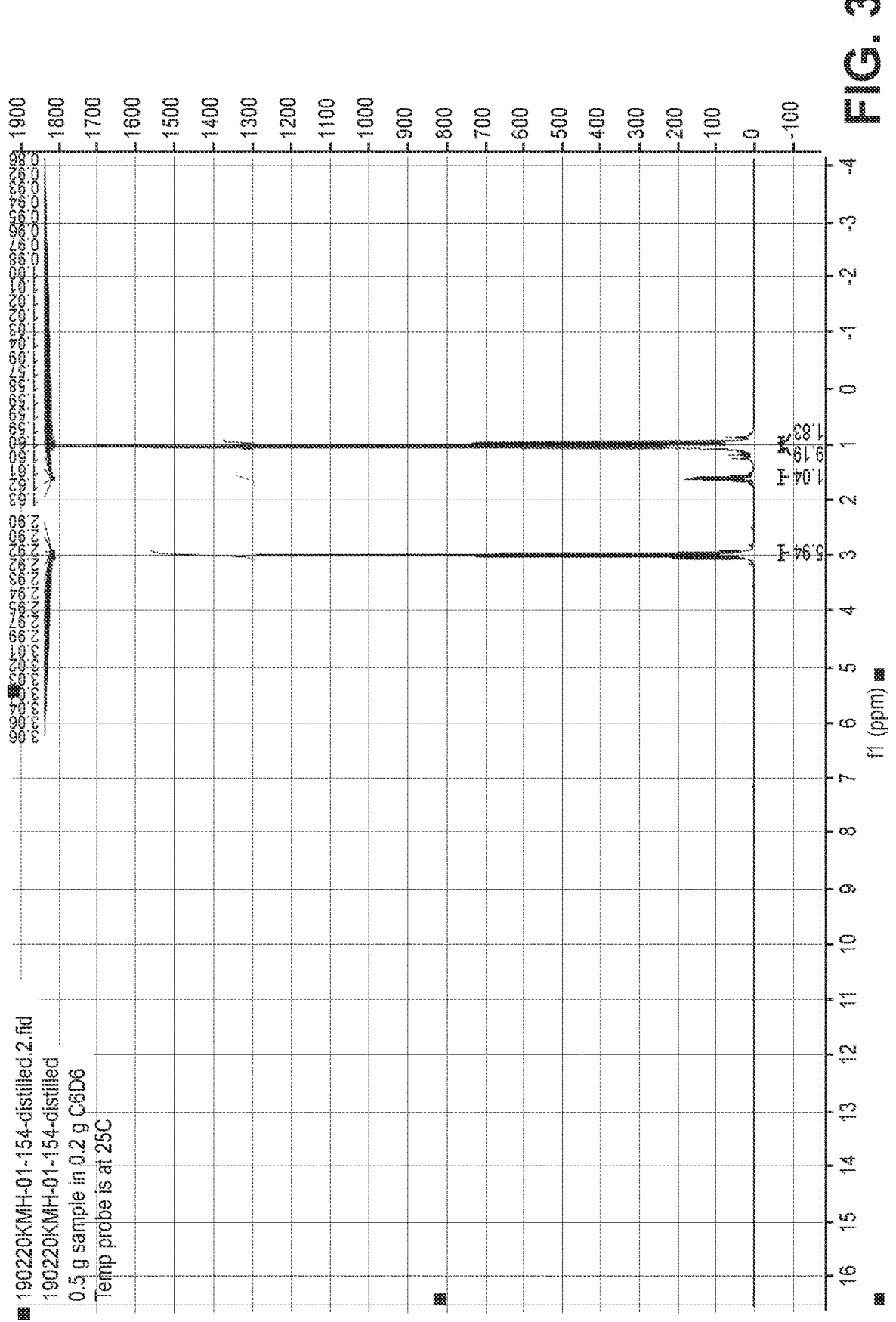
FIG. 3 is a $^1$H NMR spectrum of n-PrSn(NEt$_2$)$_3$ in benzene-d$_6$.

FIG. 1 shows the $^{119}$Sn NMR spectrum of LiSn(NEt$_2$)$_3$ in benzene-d$_6$. The spectrum shows a single peak at 31.53 ppm. FIG. 2 shows the $^{119}$Sn NMR spectrum of n-PrSn(NEt$_2$)$_3$ in benzene-d$_6$. The spectrum shows the following chemical shifts: $^{119}$Sn NMR (149 MHZ, benzene-d$_6$) 8 17.35, −43.75, −68.88. The peak at −43.75 ppm accounts for 99% of the peak integration and is associated with a high purity of the monoalkyl tin triamide product. FIG. 3 is the $^1$H NMR spectrum of n-PrSn(NEt$_2$)$_3$ in benzene-d$_6$. The spectrum shows the following chemical shifts: 1H NMR (400 MHZ, benzene-d$_6$) δ 3.08-2.88 (m, 6H, —N—CH$_2$—), 1.67-1.53 (m, 1H, —Sn—CH$_2$—CH$_2$—), 1.11-0.89 (m, 11H, —CH$_3$).

(b) Conversion to $CH_3CH_2CH_2Sn(OC(CH_3)_2CH_2CH_3)_3$

N-propyl tin tris(diethylamide) (31.4 mmol) from Step (a) of Example 1 was added to a 50-mL round bottom flask equipped with a stir bar. The flask was cooled to 0° C. in an ice bath followed by slow, dropwise addition of t-amyl alcohol (97.3 mmol, Aldrich). The reaction was then brought to room temperature and stirred for 30 minutes. Volatile components of the solution were removed under vacuum, and the crude product was purified via vacuum distillation (400 mTorr, 65-70° C.) to produce n-PrSn(O-tAm)$_3$ as a colorless oil in 81% yield.

Figure 4:
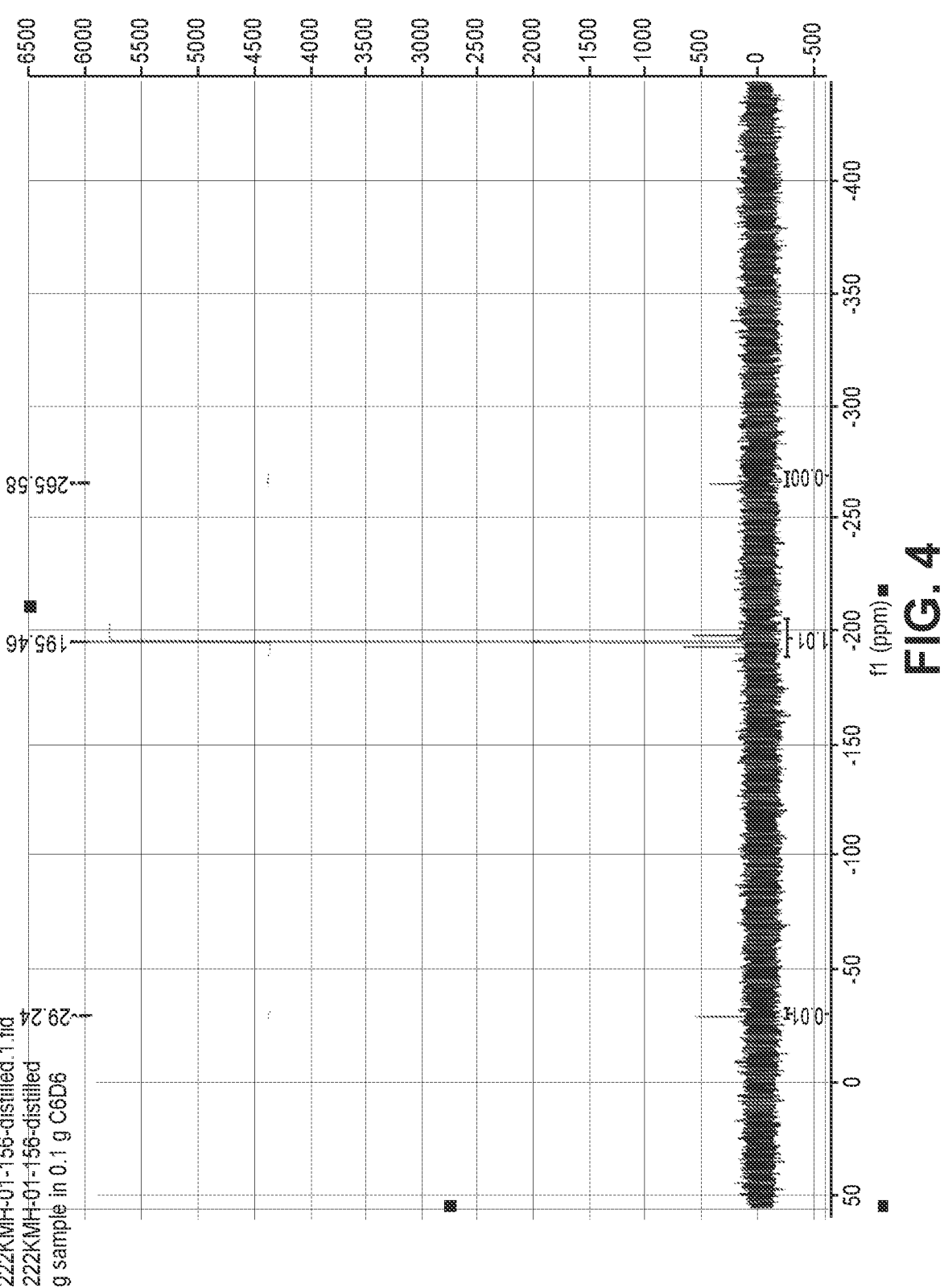
FIG. 4 is a $^{119}$Sn NMR spectrum of n-PrSn(O-tAm)$_3$ in benzene-d$_6$.
Figure 5:
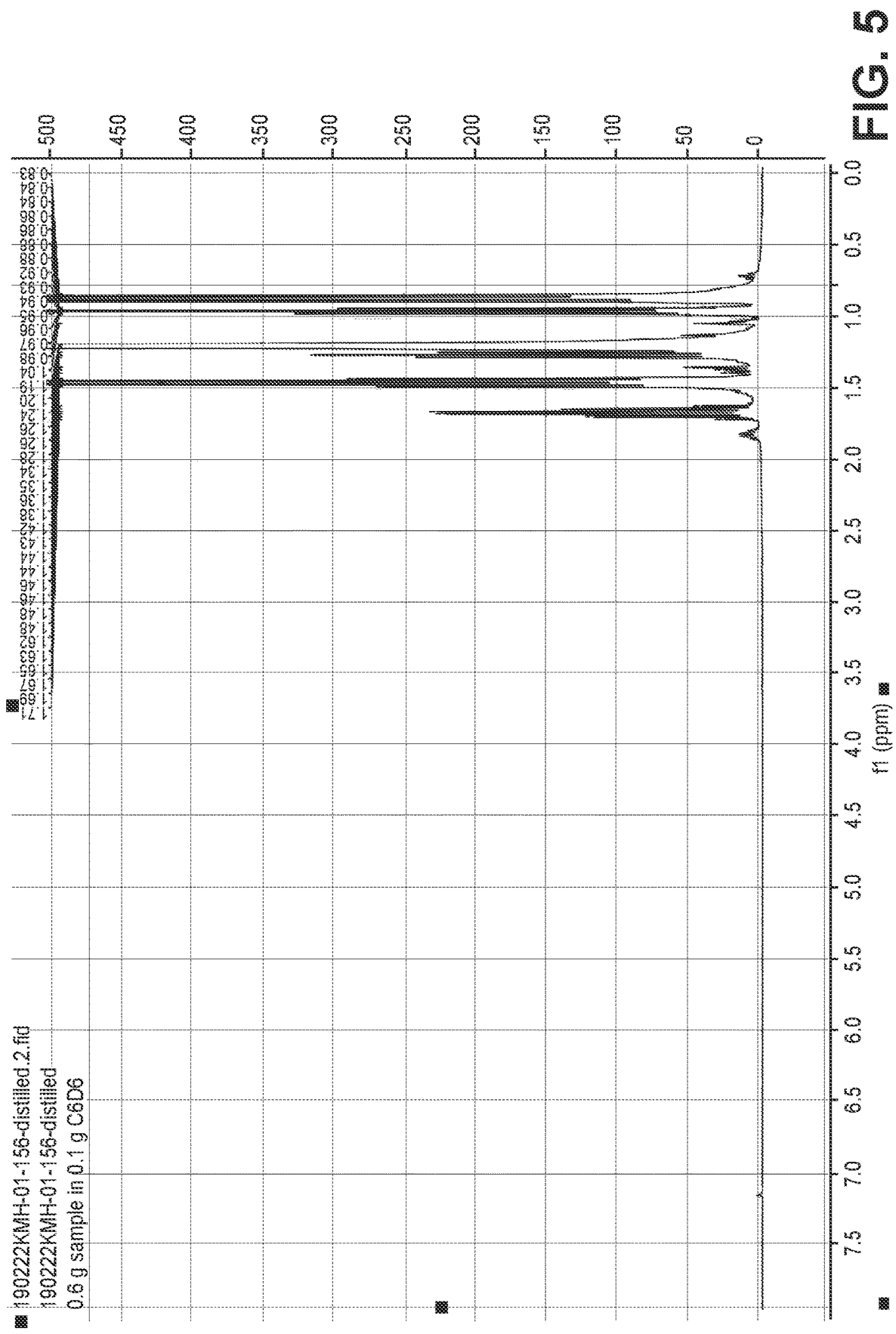
FIG. 5 is a $^1$H NMR spectrum of n-PrSn(O-tAm)$_3$ in benzene-d$_6$.

FIG. 4 shows the $^{119}$Sn spectrum of n-PrSn(O-tAm)$_3$ in benzene-d$_6$. The spectrum shows the following chemical shifts: $^{119}$Sn NMR (149 MHZ, benzene-d$_6$) 8-195.65. The single peak is consistent with a singular tin environment and thus a monoalkyl tin product. FIG. 5 is the 1H spectrum of n-PrSn(O-tAm)$_3$ in benzene-d$_6$ with chemical shifts: $^1$H NMR (400 MHZ, benzene-d$_6$) 8 1.65 (hept, J=7.5 Hz, 1H), 1.45 (qd, J=7.5, 1.8 Hz, 3H), 1.30-1.17 (m, 9H), 0.96 (d, J=7.2 Hz, 1H), 0.94-0.78 (m, 5H). Quantitative proton tin NMR and proton NMR were performed with a selected standard to evaluate the purity of the product. $^{119}$Sn qNMR, standard $CH_3Sn(C_6H_6)_3$, purity 94.2 (7) mol % monoalkyl tin; 1H qNMR, standard 1, 3, 5-trimethoxybenzene, purity 95.60 (2) mol % monoalkyl tin.

Example 2. Preparation of $CH_3CH_2Sn(N(CH_2 CH_3)_2)_3$ and $CH_3CH_2Sn(OC(CH_3)_2CH_2CH_3)_3$ This example presents the synthesis of an ethyl tin triamide, $CH_3CH_2Sn(N(CH_2CH_3)_2)_3$, abbreviated as EtSn $(NEt_2)_3$, via an oxidative stannylation reaction involving $SnCl_2$, diethylamine, n-butyl lithium, and iodoethane and its subsequent conversion to an ethyl tin trialkoxide, $CH_3CH_2Sn(OC(CH_3)_2CH_2CH_3)_3$, abbreviated as EtSn(O-tAm)_3.

(a) Synthesis of $CH_3CH_2Sn(N(CH_2CH_3)_2)_3$

Diethylamine (1442 mmol, Aldrich) and anhydrous diethyl ether (437 ml, Aldrich) were mixed in a 3 L round bottom flask under positive $N_2$ (g) pressure with an $N_2$ flow; the flask was equipped with a bubbler and pressure-relief outlet to support a continuous $N_2$ (g) flow. The reactor was cooled to 0° C. in an ice-water bath followed by dropwise addition of 1236 mmol of n-butyl lithium (Aldrich, 1.55 M in hexanes). After stirring for 1 hour, an intermediate product, $LiNEt_2$, was formed and a duplicate sample was prepared for characterization. Then, $SnCl_2$ (412 ml, 1M, Fisher) in tetrahydrofuran was added to the solution dropwise, which was then stirred for 1 hour. Intermediate product, $LiSn(NEt_2)_3$, was formed and a duplicate sample was prepared for characterization. Iodoethane (618 mmol, Aldrich) was then added dropwise followed by warming the reaction to room temperature and stirring it overnight. Volatile components of the solution were removed under vacuum. Two 500-mL portions of anhydrous pentane were added to the flask followed by filtration through Celite® S (Aldrich). The filtrate was concentrated to remove volatile components before being purified via vacuum distillation (60 mTorr, 80-85° C.) to yield ethyl-tin[tris(diethylamide)]. EtSn $(NEt_2)_3$, as a colorless liquid in 78.6% yield.

Figure 6:
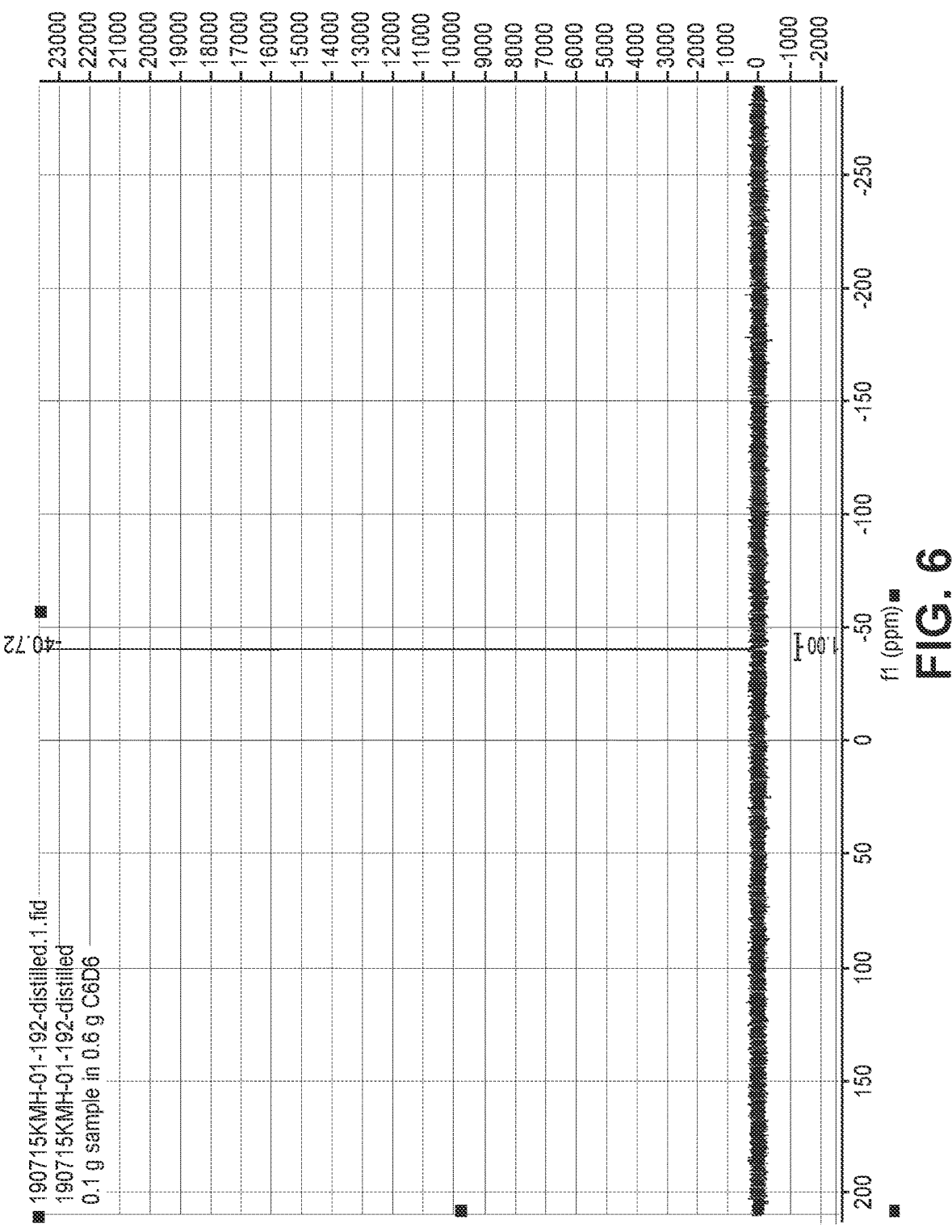
FIG. 6 is a $^{119}$Sn NMR spectrum of EtSn(NEt$_2$)$_3$ in benzene-d$_6$.

FIG. 6 shows the $^{119}$Sn NMR spectrum of EtSn(NEt_2)_3. The spectrum shows displays the following chemical shifts: $^{119}$Sn NMR (149 MHZ, benzene-d_6) δ-40.69. The single peak at −40.69 ppm is associated with a high purity of the monoalkyl tin triamide product.

(b) Conversion to $CH_3CH_2Sn(OC(CH_3)_2CH_2CH_3)_3$

Ethyl-tin[tris(diethylamide)](324 mmol) from Step (a) of Example 2 was added to a 400-mL reactor containing 50-mL pentane. The flask was cooled to 0° C. with a chiller followed by a slow dropwise addition of t-amyl alcohol (1004 mmol, Aldrich). Reaction was brought to room temperature and stirred for 30 minutes. Volatile components of the solution were removed under vacuum, and the crude product was purified via vacuum distillation (40 mTorr, 82-88° C.) to produce EtSn(O-tAm)_3 as a colorless oil in 97% yield.

Figure 7:
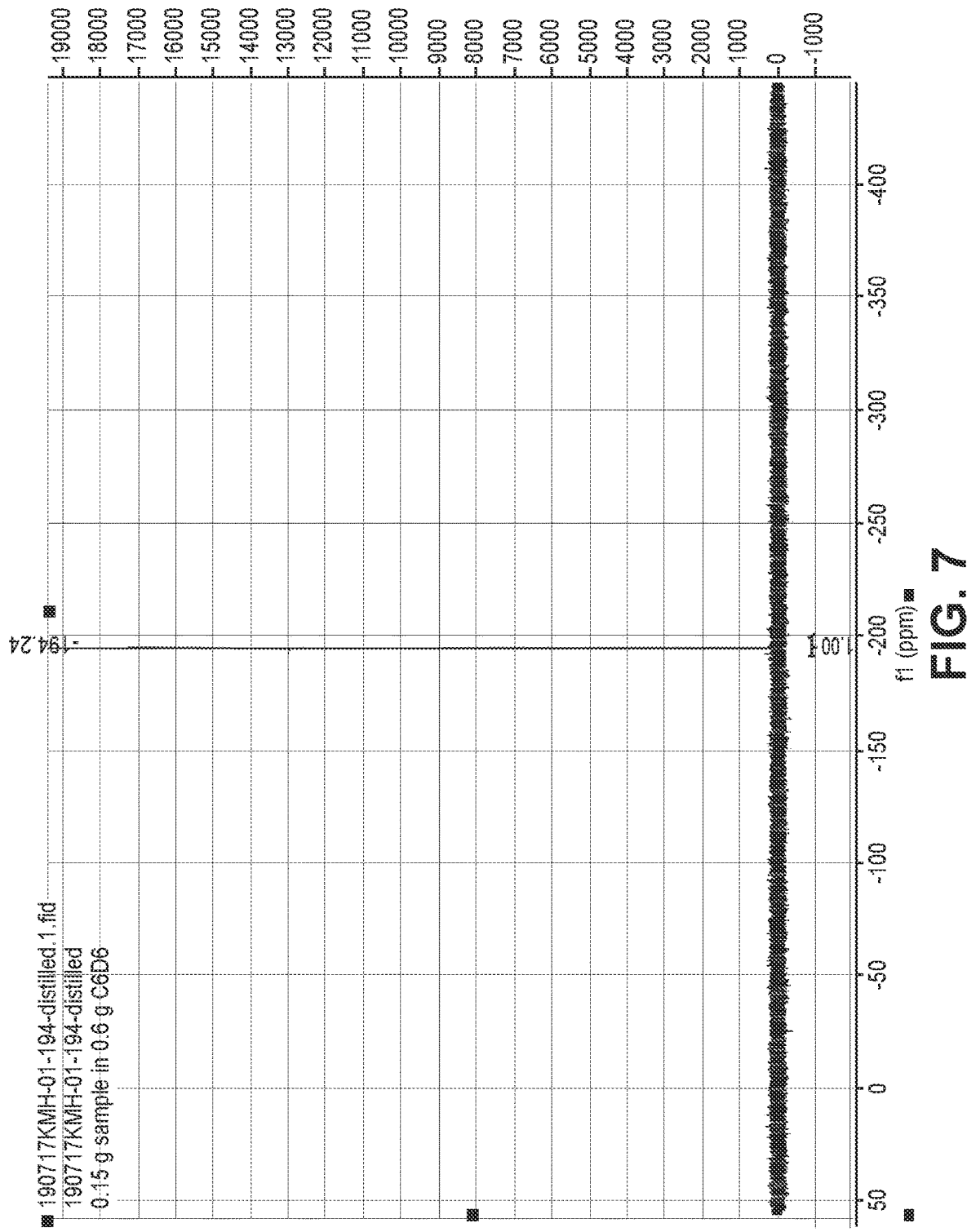
FIG. 7 is a $^{119}$Sn NMR spectrum of EtSn(O-tAm)$_3$ in benzene-d$_6$.

FIG. 7 shows the $^{119}$Sn NMR spectrum of EtSn(O-tAm)_3 in benzene-d_6. The spectrum shows the following chemical shifts: $^{119}$Sn NMR (149 MHZ, benzene-d_6) δ-194.24. The single peak is consistent with a singular tin environment and thus a monoalkyl tin product. Quantitative proton tin NMR and proton NMR were performed with a selected standard to evaluate the purity of the product. $^{119}$Sn qNMR, standard $CH_3Sn(C_6H_6)_3$, purity 95.5 (8) mol % monoalkyl tin; 1H qNMR, standard 1, 3, 5-trimethoxybenzene, purity 96.8 (1) mol % monoalkyl tin.

The thermal behavior of the reactions to form the ethyl tin triamide and ethyl tin trialkoxide are summarized below.

| | MAT (° C.) | ΔH_r (kJ/mol) | TC (%) |
|---|---|---|---|
| 1. LiSn(NEt_2)_3 + EtI → EtSn (NEt_2)_3 | 24 | −128 | 27 |
| 2. EtSn(NEt_2)_3 + t-AmOH → EtSn(O-tAm)_3 | 64 | −65 | 99 |

Example 3. Preparation of $(CH_3)_3CSn(N(CH_2 CH_3)_2)_3$ and $(CH_3)_3CSn(OC(CH_3)_2CH_2CH_3)_3$ This example presents the synthesis of a t-butyl tin triamide, $(CH_3)_3CSn(N(CH_2CH_3)_2)_3$, abbreviated as t-BuSn $(NEt_2)_3$, via an oxidative stannylation reaction involving $SnCl_2$. diethylamine, n-butyl lithium, and t-butyl iodide and its subsequent conversion to a t-butyl tin trialkoxide, $(CH_3)_3CSn(OC(CH_3)_2CH_2CH_3)_3$, abbreviated as t-BuSn(O-tAm)_3.

(a) Synthesis of $(CH_3)_3CSn(N(CH_2CH_3)_2)_3$

Diethylamine (88 mmol, Aldrich) and anhydrous diethyl ether (27 ml, Aldrich) were mixed under positive $N_2$ (g) pressure with an $N_2$ flow in a 400-mL reactor equipped with a bubbler outlet. The reactor was cooled to 0° C. followed by dropwise addition of 50 mmol of n-butyl lithium (Aldrich, 1.6 M in hexanes). After stirring for 30 minutes, an intermediate product, $LiNEt_2$, was formed and partially isolated for characterization. Then $SnCl_2$ (28 ml, 1 M, Fisher) in tetrahydrofuran was added to the solution dropwise. The reactor was warmed to 20° C. and stirred for 30 minutes. Intermediate product, $LiSn(NEt_2)_3$, was formed and partially isolated for characterization. The solution was again cooled to 0° C. followed by dropwise addition of t-butyl iodide (38 mmol, Aldrich). The solution was warmed to 40° C. and stirred overnight. Volatile components of the solution were then removed under vacuum. Anhydrous pentane (2×60 ml, Aldrich) was added to the flask and the mixture was filtered through Celite® S (Aldrich). Another 60 mL of anhydrous pentane was used to wash the flask and the mixture was also filtered. The filtrate was concentrated to remove volatile components before being purified via vacuum distillation (250 mTorr, 72-76° C.) to yield t-butyl tin tris(diethylamide), t-BuSn(NEt_2)_3, as a colorless liquid in 53% yield.

Figure 8:
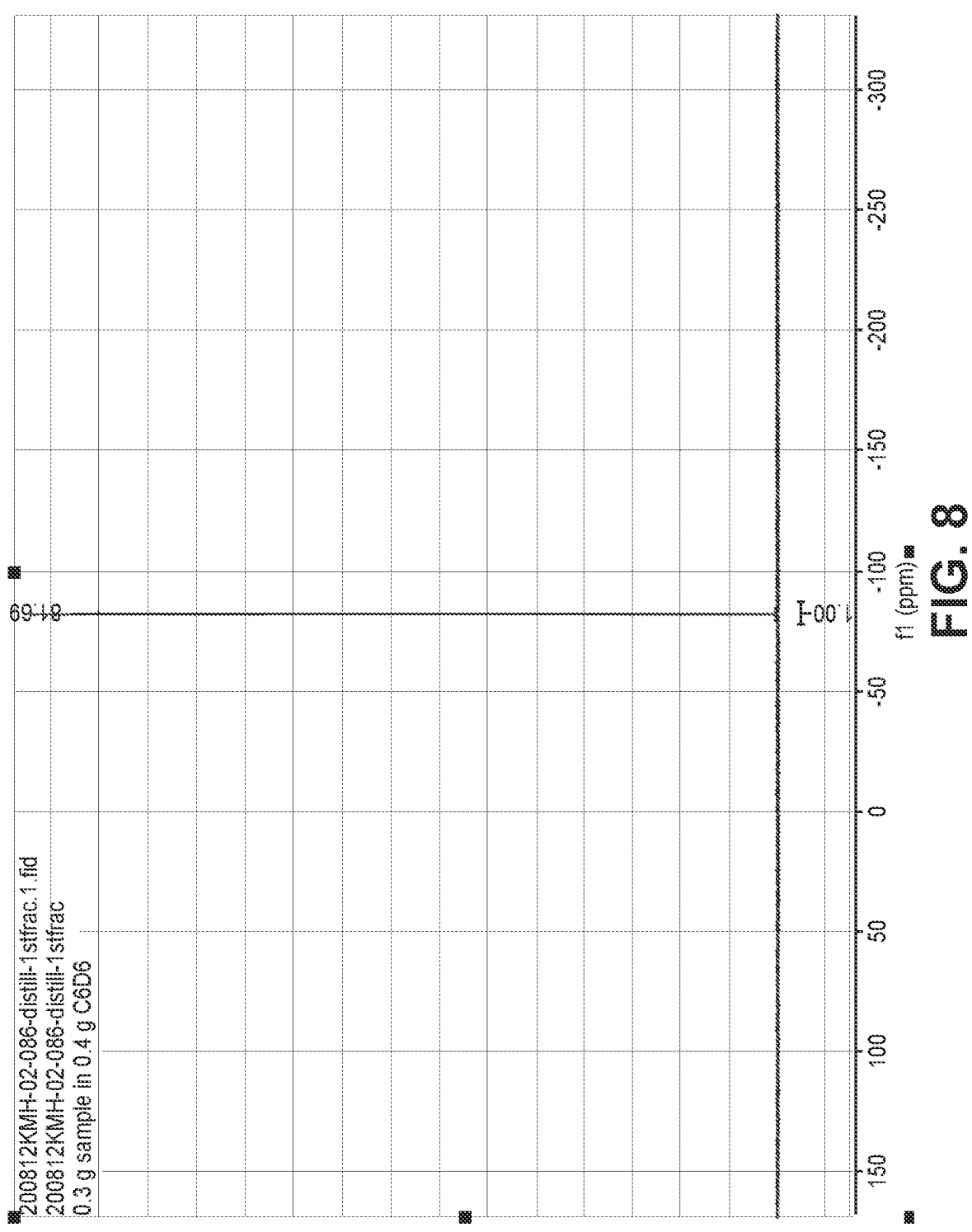
FIG. 8 is a $^{119}$Sn NMR spectrum of t-BuSn(NEt$_2$)$_3$ in benzene-d$_6$.

FIG. 8 shows the $^{119}$Sn NMR spectrum of t-BuSn(NEt_2)_3 in benzene-d_6. The spectrum shows the following chemical shifts: $^{119}$Sn NMR (149 MHZ, benzene-d_6) δ-81.69. The sharp single peak at −81.69 ppm is associated with a high purity of the monoalkyl tin triamide product. No additional peaks are seen after distillation of the triamide.

(b) Conversion to $(CH_3)_3CSn(OC(CH_3)_2CH_2CH_3)_3$

T-butyl tin tris(diethylamide) (13.2 mmol) from Step (a) of Example 3 was added to a 50-mL round bottom flask equipped with a stir bar. The flask was cooled to 0° C. in an ice bath followed by slow, dropwise addition of t-amyl alcohol (41 mmol, Aldrich). The reaction was then brought to room temperature and stirred for 30 minutes. Volatile components of the solution were removed under vacuum, and the crude product was purified via vacuum distillation (60 mTorr, 90° C.) to produce t-BuSn(O-tAm)$_3$ as a colorless oil in 94% yield.

Figure 9:
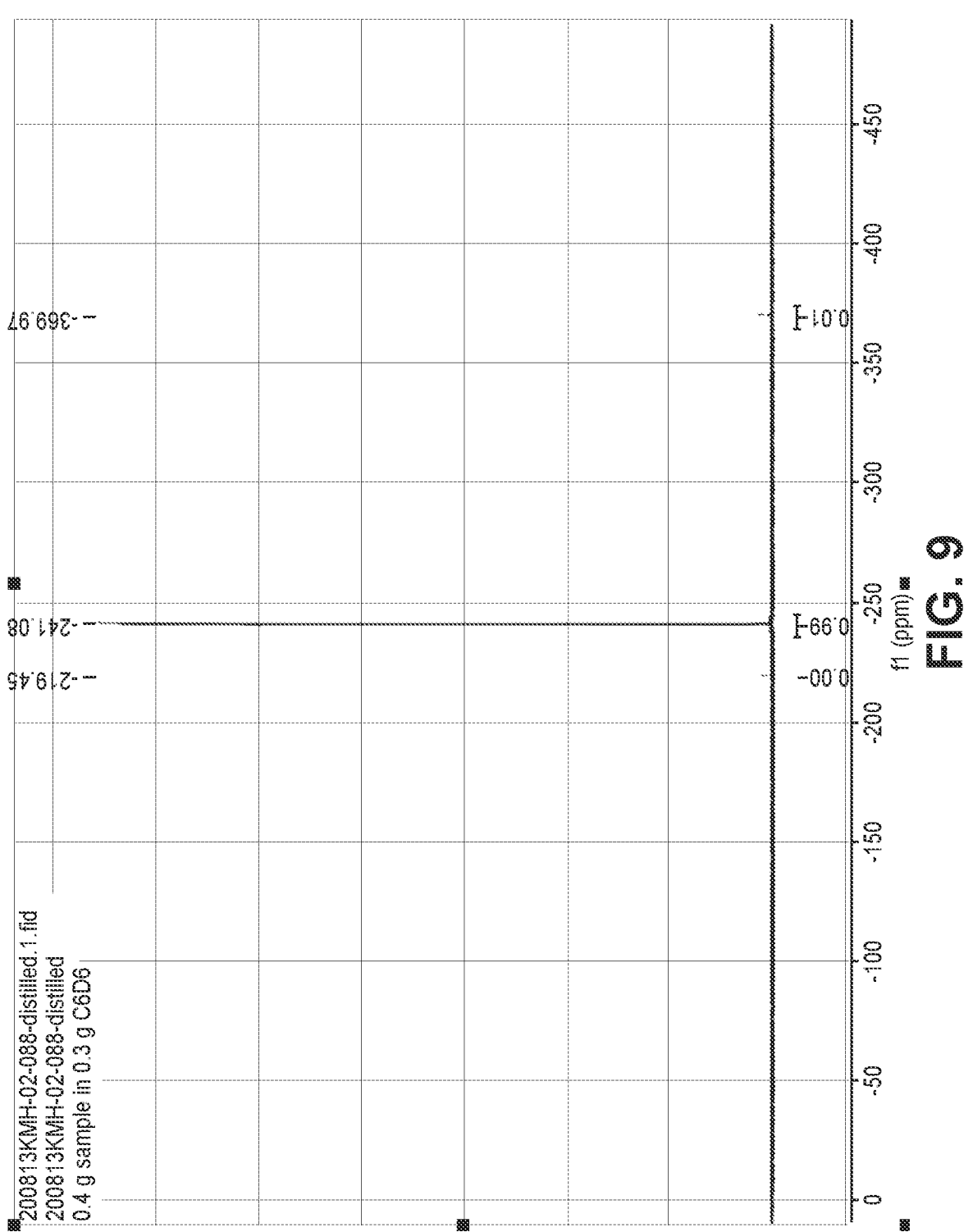
FIG. 9 is a $^{119}$Sn NMR spectrum of t-BuSn(O-tAm)$_3$ in benzene-d$_6$.

FIG. 9 shows the $^{119}$Sn spectrum of t-BuSn(O-tAm)$_3$ in benzene-d$_6$. The spectrum shows the following chemical shifts: $^{119}$Sn NMR (149 MHZ, benzene-d$_6$) δ-219.45, –241.08, –369.97. The peak at –219.45 ppm has an integration of 0.0018 and is not associated with a bialkyl product. The peak at –241.08 ppm has an integration of 0.9897 and is consistent with the monoalkyl t-BuSn(O-tAm)$_3$ product. The peak at –369.97 ppm has an integration of 0.0086 and is attributed to Sn(O-tAm) 4.

The NMR results clearly demonstrate the ability to selectively synthesize the monoalkyl tin triamide and trialkoxide products.

Example 4. Preparation of (NC(CH$_3$)$_2$C) Sn(N (CH$_2$CH$_3$)$_2$)$_3$

This example presents the synthesis of an isobutyronitrile tin triamide, (NC(CH$_3$)$_2$C) Sn(N(CH$_2$CH$_3$)$_2$)$_3$, abbreviated as (NC(CH$_3$)$_2$C) Sn(NEt$_2$)$_3$, via an oxidative stannylation reaction involving SnCl$_2$, diethylamine, n-butyl lithium, and 2-bromo-2-methylpropanenitrile.

Diethylamine (87.5 mmol, Aldrich) and anhydrous diethyl ether (26.5 ml, Aldrich) were mixed under a N$_2$ (g) flow in a 250 mL round bottom flask equipped with a bubbler pressure-relief outlet. The reactor was cooled to 0° C. in an ice-water bath followed by dropwise addition of 75 mmol of n-butyl lithium (Aldrich, 2.53 M in hexanes). After stirring for 30 minutes, SnCl$_2$ (25 ml, 1M, Fisher) in tetrahydrofuran was added to the solution dropwise and then stirred for 1 hour. Then, 2-bromo-2-methylpropanenitrile (37.5 mmol, synthesized in house) was added. The reaction was warmed to room temperature and stirred for 1 hour. Volatile solution components were removed under vacuum. Two portions of 100 mL of anhydrous pentane were added to the flask followed by filtration through Celite® S (Aldrich). The filtrate was concentrated to remove volatile components before being purified via vacuum distillation (250 mTorr, 70-76° C.) to yield isobutyronitrile tin tris (diethylamide) as a yellow oil in 21% yield.

Figure 10:
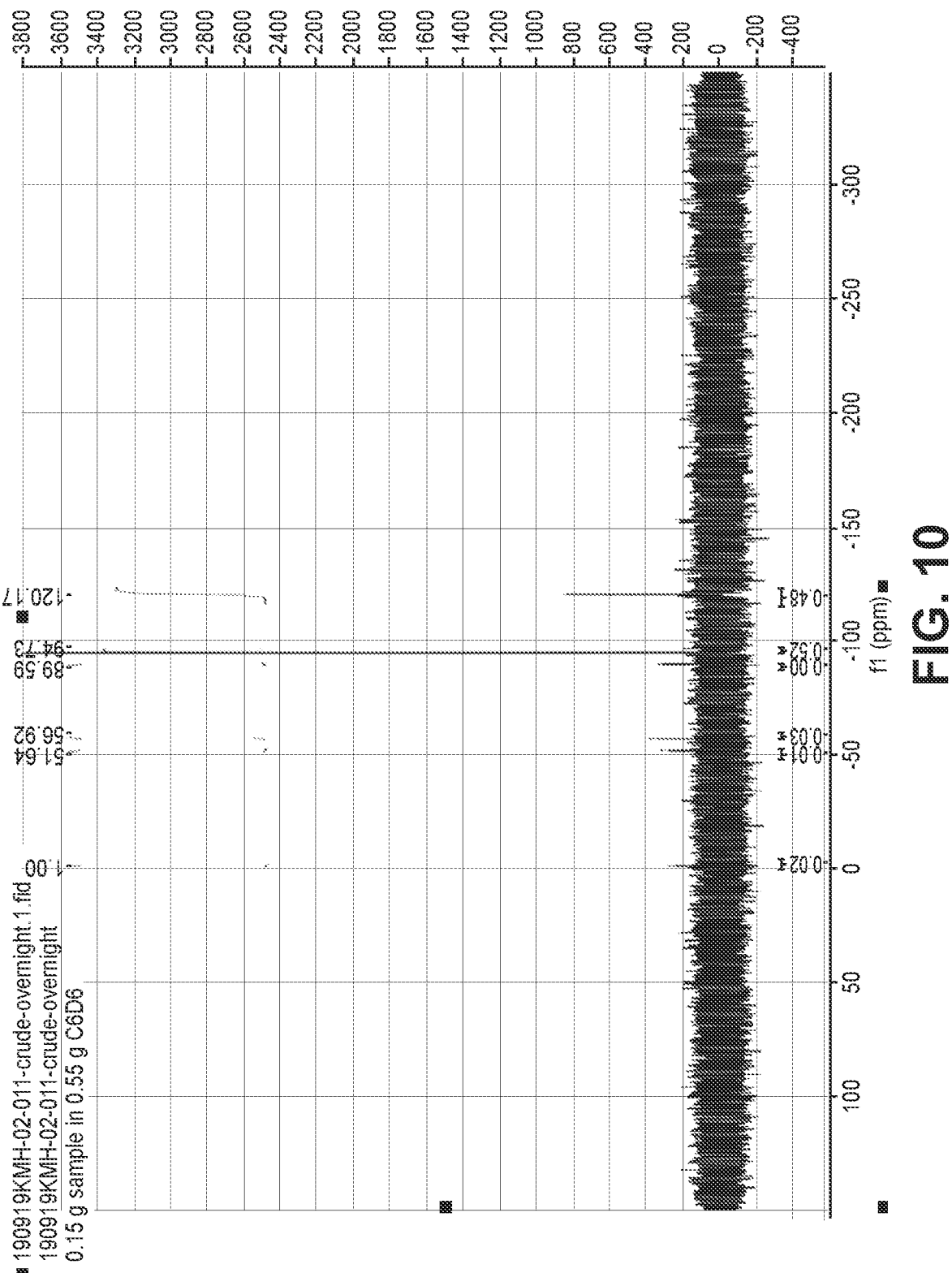
FIG. 10. is a $^{119}$Sn NMR spectrum of (NC(CH$_3$)$_2$C) Sn(NEt$_2$)$_3$ in benzene-d$_6$.

FIG. 10 shows the $^{119}$Sn NMR spectrum of (NC(CH$_3$)$_2$C) Sn(NEt$_2$)$_3$ in benzene-d$_6$. The filtrate was concentrated to remove all volatile components before taking the $^{119}$Sn NMR spectrum shown in FIG. 10. The spectrum shows a primary singlet and a secondary singlet with the following chemical shifts: $^{119}$Sn NMR (149 MHZ, Benzene-d$_6$) δ-94.73, –120.28.

Example 5. Preparation of (CH$_3$OCH$_2$) Sn(CCSi(CH$_3$)$_3$)$_3$

This example presents the synthesis of a methoxymethyl tin triacetylide, (CH$_3$OCH$_2$) Sn(CCSi(CH$_3$)$_3$)$_3$, abbreviated as (CH$_3$OCH$_2$) Sn(CCSiMe$_3$)$_3$ or MOMSn(CCTMS)$_3$, via an oxidative stannylation reaction involving trimethylsilyl acetylene, SnCl$_2$, n-butyl lithium, and chloromethyl methyl ether.

Trimethylsilyl acetylene (248 mmol, Oakwood, abbreviated "HCCTMS") and anhydrous diethyl ether (123 ml, Aldrich) were mixed in under flowing N$_2$ (g) to create a positive N$_2$ pressure in a 400-mL reactor equipped with a pressure-relief bubbler. The reactor was cooled to 0° C. with a chiller followed by a slow dropwise addition of 240 mmol n-butyl lithium (Aldrich, 1.64 M in hexanes). After stirring for 30 minutes, an intermediate product, LiCCSiMe$_3$, also abbreviated LiCCTMS, was formed and a duplicate sample was prepared for characterization. Then SnCl$_2$ (80 ml, 1M, Fisher) in tetrahydrofuran was added to the solution dropwise. The solution was stirred for 2 hours at room temperature. Intermediate product, LiSn(CCSiMe$_3$)$_3$, also abbreviated LiSn(CCTMS)$_3$, was formed and a duplicate sample was prepared for characterization. The reactor was subsequently cooled to 0° C. with a chiller followed by dropwise addition of chloromethyl methyl ether (88 mmol, Aldrich, abbreviated "MOM-Cl") and then stirred at room temperature overnight. Volatile components of the solution were removed under vacuum. Two aliquots of 200 mL each of anhydrous pentane were added to the flask followed by filtration through Celite® S (Aldrich). The filtrate was concentrated to remove volatile components (250 mTorr, 70-76° C.) to yield methoxymethyl tin tris(trimethylsilyl acetylide), MOMSn(CCTMS)$_3$, as a white powder in 31% yield.

Figure 11:
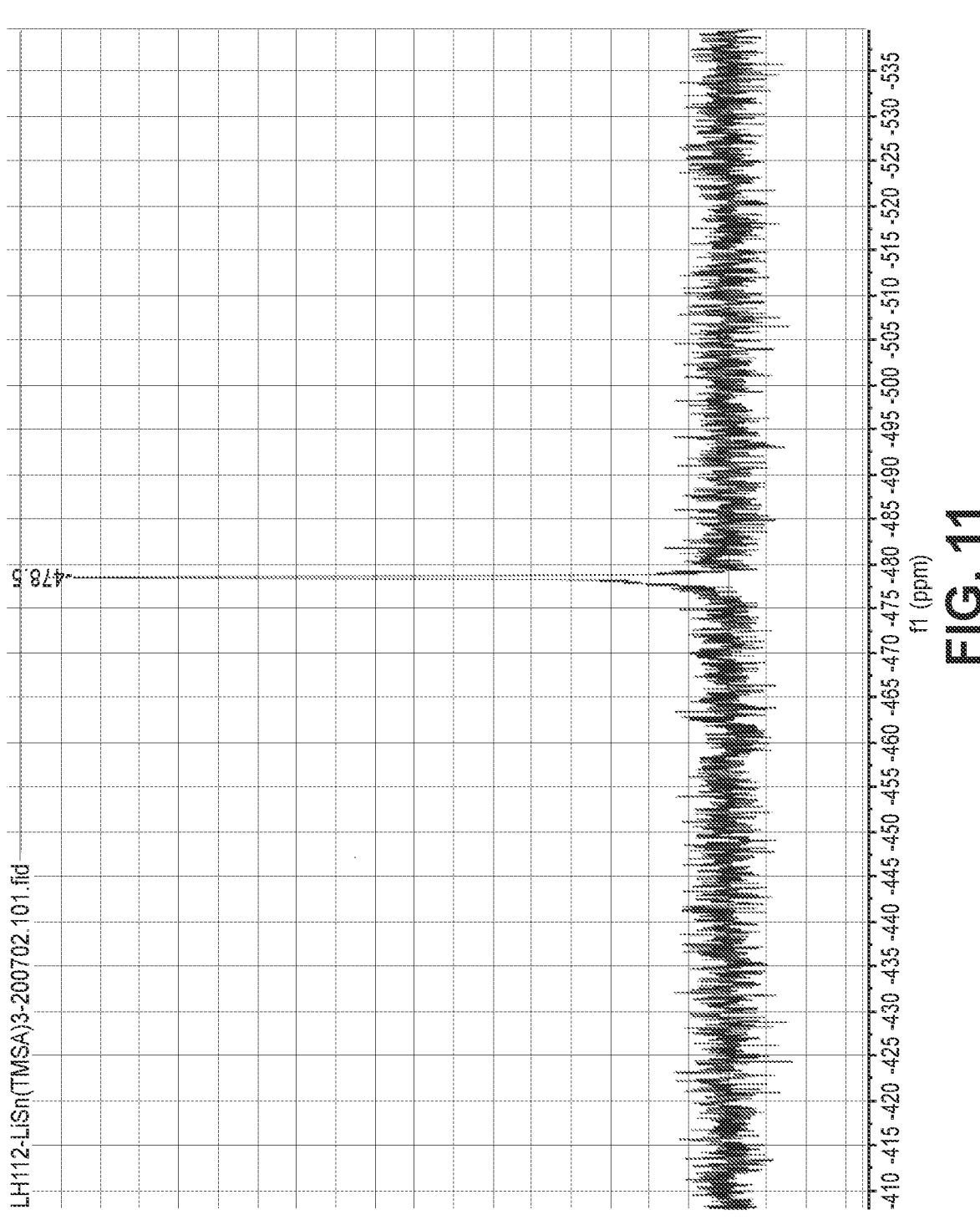
FIG. 11 is a $^{119}$Sn NMR spectrum of LiSn(CCSiMe$_3$)$_3$ in benzene-d$_6$.
Figure 12:
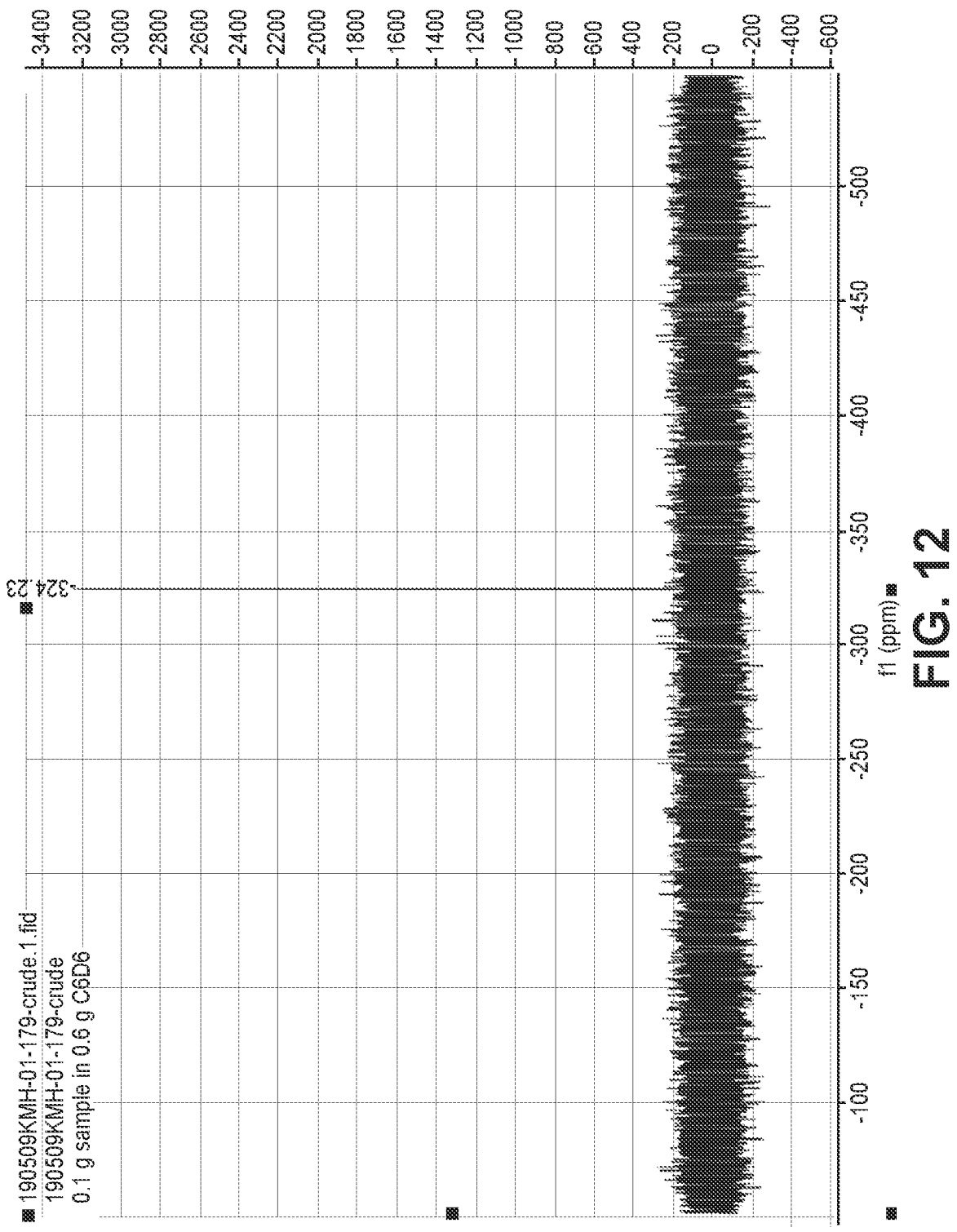
FIG. 12 is a $^{119}$Sn NMR spectrum of (CH$_3$OCH$_2$) Sn(CC-SiMe$_3$)$_3$ in benzene-d$_6$.

FIG. 11 shows the $^{119}$Sn NMR spectrum of LiSn(CC-SiMe$_3$)$_3$ in benzene-d$_6$. The spectrum shows a single peak at –478.5 ppm. FIG. 12 shows the $^{119}$Sn NMR spectrum of (CH$_3$OCH$_2$) Sn(CCSiMe$_3$)$_3$ in benzene-d$_6$ with chemical shifts: $^{119}$Sn NMR (149 MHZ, Benzene-d$_6$) δ-324.23. The single sharp peak at –324.23 ppm is associated with a high purity of the monoalkyl tin triacetylide product.

The thermal behavior of the reactions to form each product is summarized below.

| | MAT (° C.) | ΔH$_r$ (kJ/mol) | TC (%) |
|---|---|---|---|
| 1. HCCTMS+ n-BuLi → LiCCTMS | 98 | –160 | 99 |
| 2. LiCCTMS + SnCl$_2$ → LiSn(CCTMS)$_3$ | 27 | –177 | 100 |
| 3. LiSn(CCTMS)$_3$ + MOM-Cl → MOMSn(CCTMS)$_3$ | 10 | –67 | 86 |

Example 6. Preparation of (NC(CH$_3$)$_2$C) Sn(CCSi(CH$_3$)$_3$)$_3$

This example presents the synthesis of an isobutyronitrile tin triacetylide, (NC(CH$_3$)$_2$C) Sn(CCSi(CH$_3$)$_3$)$_3$, abbreviated as (NC(CH$_3$)$_2$C) Sn(CCSiMe$_3$)$_3$, via an oxidative stannylation reaction involving trimethylsilyl acetylene, SnCl$_2$, n-butyl lithium, and 2-bromo-2-methylpropanenitrile.

Trimethylsilyl acetylene (232.5 mmol, Oakwood) and anhydrous diethyl ether (116 ml, Aldrich) were mixed under flowing N$_2$ (g) in a 400-mL reactor equipped with a pressure-relief bubbler outlet. The reactor was cooled to 0° C. with a chiller followed by dropwise addition of 225 mmol of n-butyl lithium (Aldrich, 2.53 M hexanes). After stirring for 30 minutes, an intermediate product, LiCCSiMe$_3$, also abbreviated LiCCTMS, was formed and a duplicate sample was prepared for characterization. Then, SnCl$_2$ (75 ml, 1M, Fisher) in tetrahydrofuran was added to the solution, dropwise. The reactor was warmed to 20° C. and stirred for 1 hour. Intermediate product, LiSn(CCSiMe$_3$)$_3$, also abbreviated LiSn(CCTMS)$_3$, was formed and a duplicate sample was prepared for characterization. The solution was again cooled to 0° C. with a chiller followed by dropwise addition of ZnBr$_2$ (75 ml, 1M, Aldrich) in THF (Aldrich). The reaction was stirred for 10 minutes. Intermediate product, Li[Zn(Sn(CCTMS)$_3$)$_3$], was formed and an additional sample was prepared for characterization. Then 82.5 mmol of 2-bromo-2-methylpropanenitrile (IBN, synthesized in house) were then added to the reaction. The reactor temperature was maintained at 0° C. and stirred overnight. 100 mL of anhydrous pentane was added to the flask followed by filtration through silica (Aldrich). Another 200 mL of anhydrous pentane were used to wash the flask, followed by filtration. The filtrate was concentrated to remove volatile components to produce isobutyronitrile tin tris(trimethylsilyl acetylide), $(NC(CH_3)_2C) Sn(CCSiMe_3)_3$, as a viscous, off-white, semi-solid in 76% yield.

Figure 13:
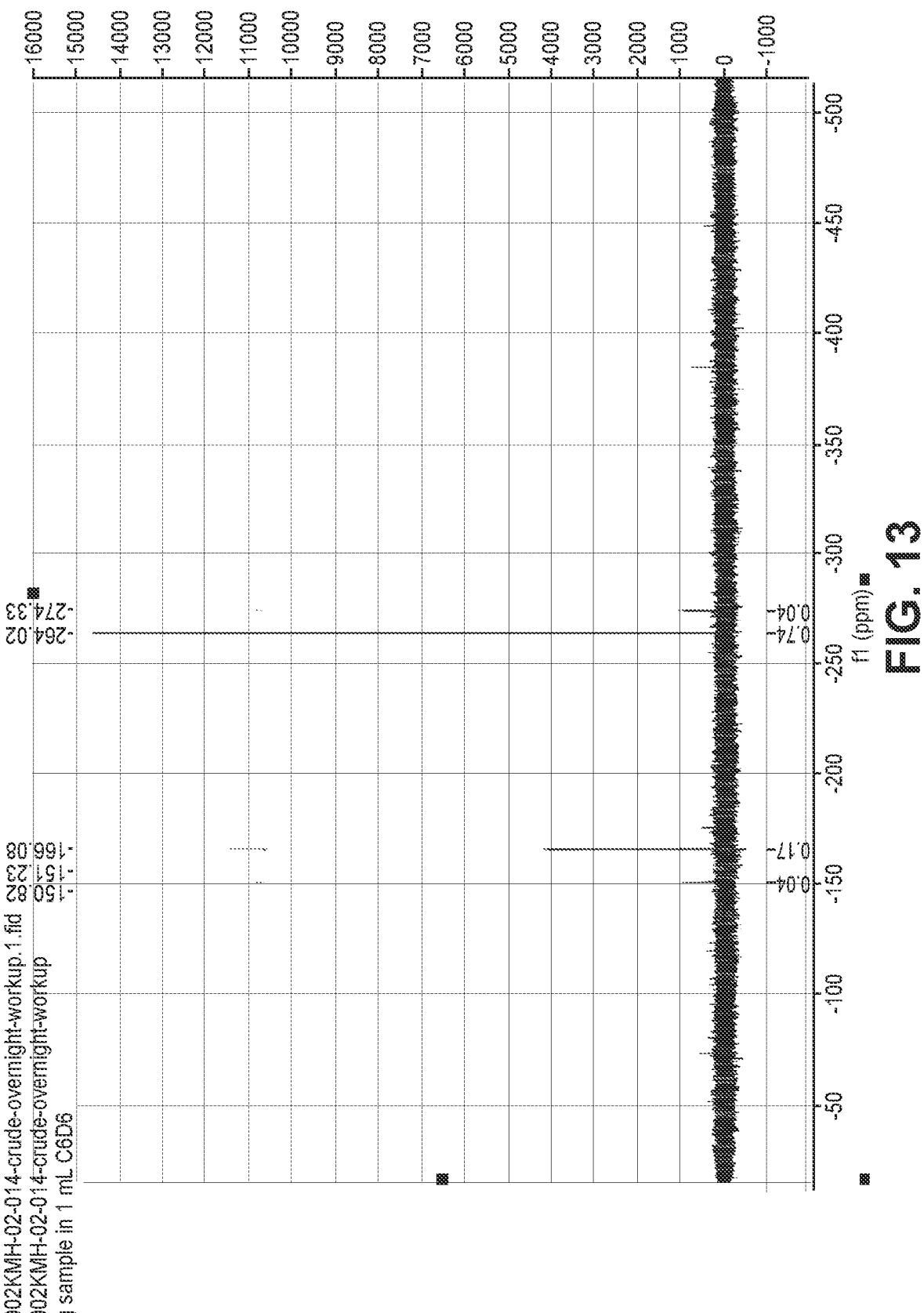
FIG. 13 is a $^{119}$Sn NMR spectrum of (NC(CH$_3$)$_2$C) Sn(CCSiMe$_3$)$_3$ in benzene-d$_6$.

FIG. 13 shows the $^{119}Sn$ NMR spectrum of $(NC(CH_3)_2C) Sn(CCSiMe_3)_3$ in benzene-$d_6$. The spectrum shows the following chemical shifts: $^{119}Sn$ NMR (149 MHZ, Benzene-$d_6$) δ-73.55,-151.23, −166.08, −175.87, −264.02, −274.33, −384.39. The primary singlet and secondary singlet are at −264.02 and −166.08 and have peak integrations of 0.75 and 0.17, respectively. The thermal behavior for reactions involving $ZnBr_2$ and IBN are summarized below.

| | MAT (° C.) | $\Delta H_r$ (kJ/mol) | TC (%) |
|---|---|---|---|
| 1. LiCCTMS + SnCl$_2$ → LiSn(CCTMS)$_3$ | 16 | −97 | 97 |
| 2. LiSn(CCTMS)$_3$ + ZnBr$_2$ → Li[Zn(Sn(CCTMS)$_3$)$_3$] | 8 | −130 | 91 |

The above examples present NMR spectra of the synthesized organotin compounds which do not show any peaks associated with polyalkyl tin compounds.

Figure 14:
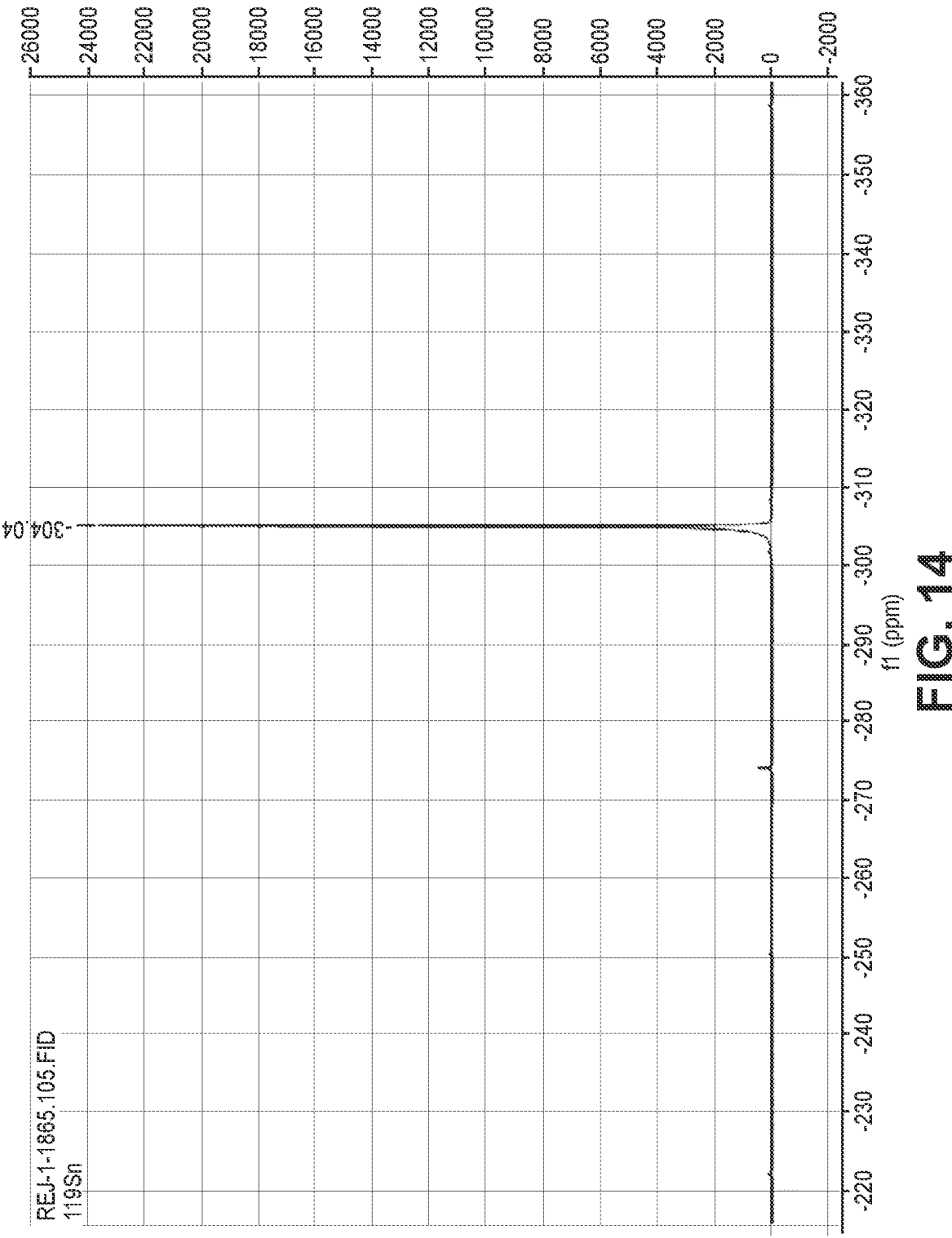
FIG. 14 is a $^{119}$Sn NMR spectra of 2-iodopropyltin tris(tert-butoxide) (2IP).
Figure 15:
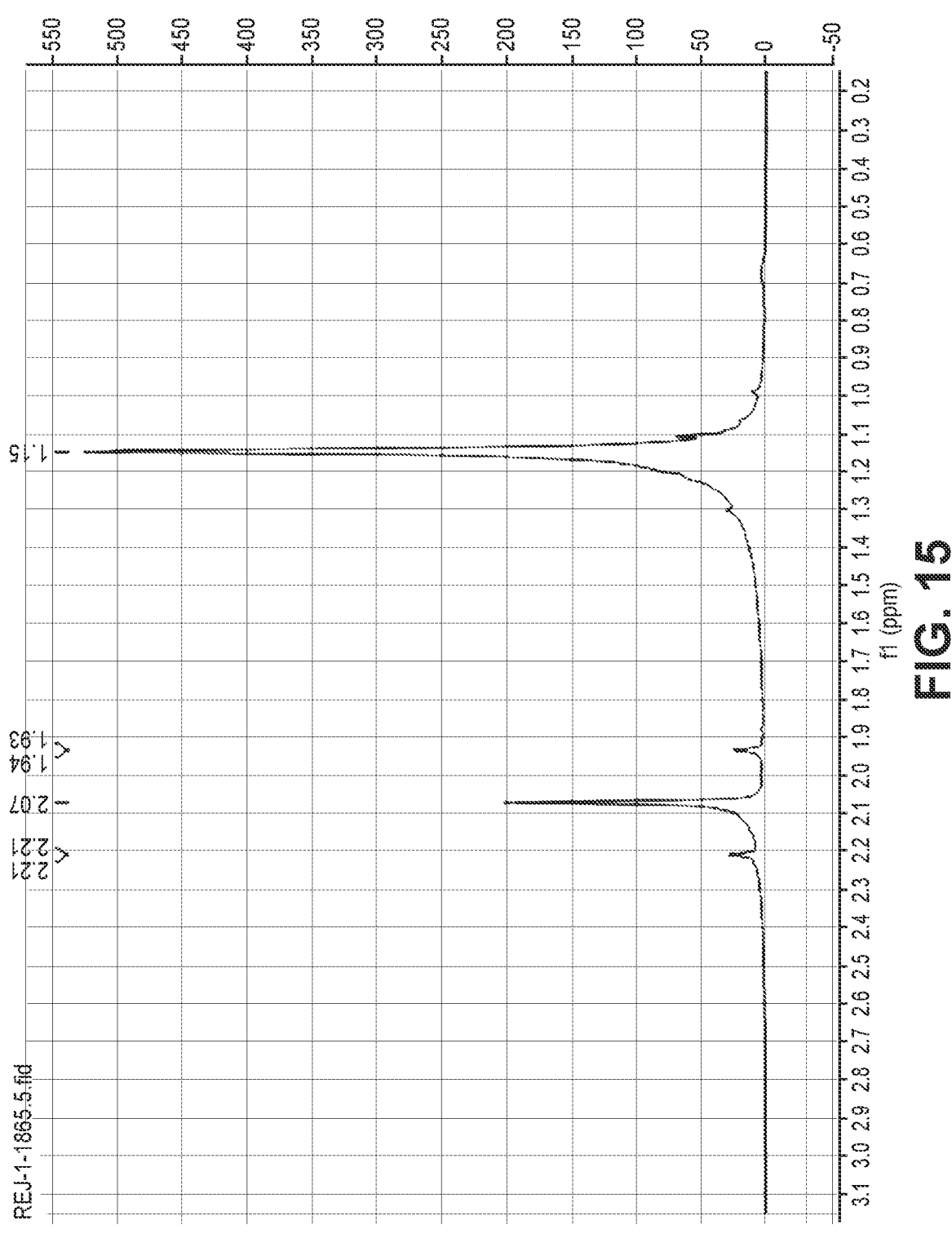
FIG. 15 is a $^1$H NMR spectra of 2IP.

Example 7. Preparation of $(CH_3)_2ICSn(N(CH_2 CH_3)_2)_3$ and $(CH_3)_2ICSn(OC(CH_3)_3)_3$ This example presents the synthesis of an iodopropyl tin triamide, $(CH_3)_2ICSn(N(CH_2CH_3)_2)_3$, abbreviated as 2-iodo-PrSn(NEt$_2$)$_3$, via an oxidative stannylation reaction involving SnCl$_2$, diethylamine, n-butyl lithium, potassium tert-butoxide, and 2,2-diiodopropane and its subsequent conversion to a 2-iodopropyltin tris(tert-butoxide), $(CH_3)_2ICSn(OC(CH_3)_3)_3$, abbreviated as iodoPrSn (O-tBu)$_3$.

nButyllithium (1.03 mL, 2.53 mmol, 2.45M in hexanes) was added to a cold solution (—50° C.) of diethylamine (0.262 g, 2.53 mmol) in diethyl ether (4 mL). After a few minutes, a slurry of tin (II) chloride (0.160 g, 0.845 mmol) and potassium tert-butoxide (0.095 g, 0.845 mmol) in THF (4 mL) was added. The contents were warmed to 0° C. and stirred for 2 h. The flask was re-cooled to −50° C. and 2,2-diiodopropane (0.25 g, 0.845 mmol) was added. The resulting reaction mixture was allowed to warm to RT over 16 h at which time solvent was removed in vacuo. The product 2-iodopropyltin tris(diethyl amide) was recrystallized from pentane and tert-butanol (3.1 eq) was added. The trialkoxide product was distilled under dynamic vacuum at 60° C. and further purified by fractional distillation. The $^{119}Sn$ NMR and the $^1H$ NMR spectra of the isolated product is shown in FIG. 14 and FIG. 15, respectively.

Figure 16:
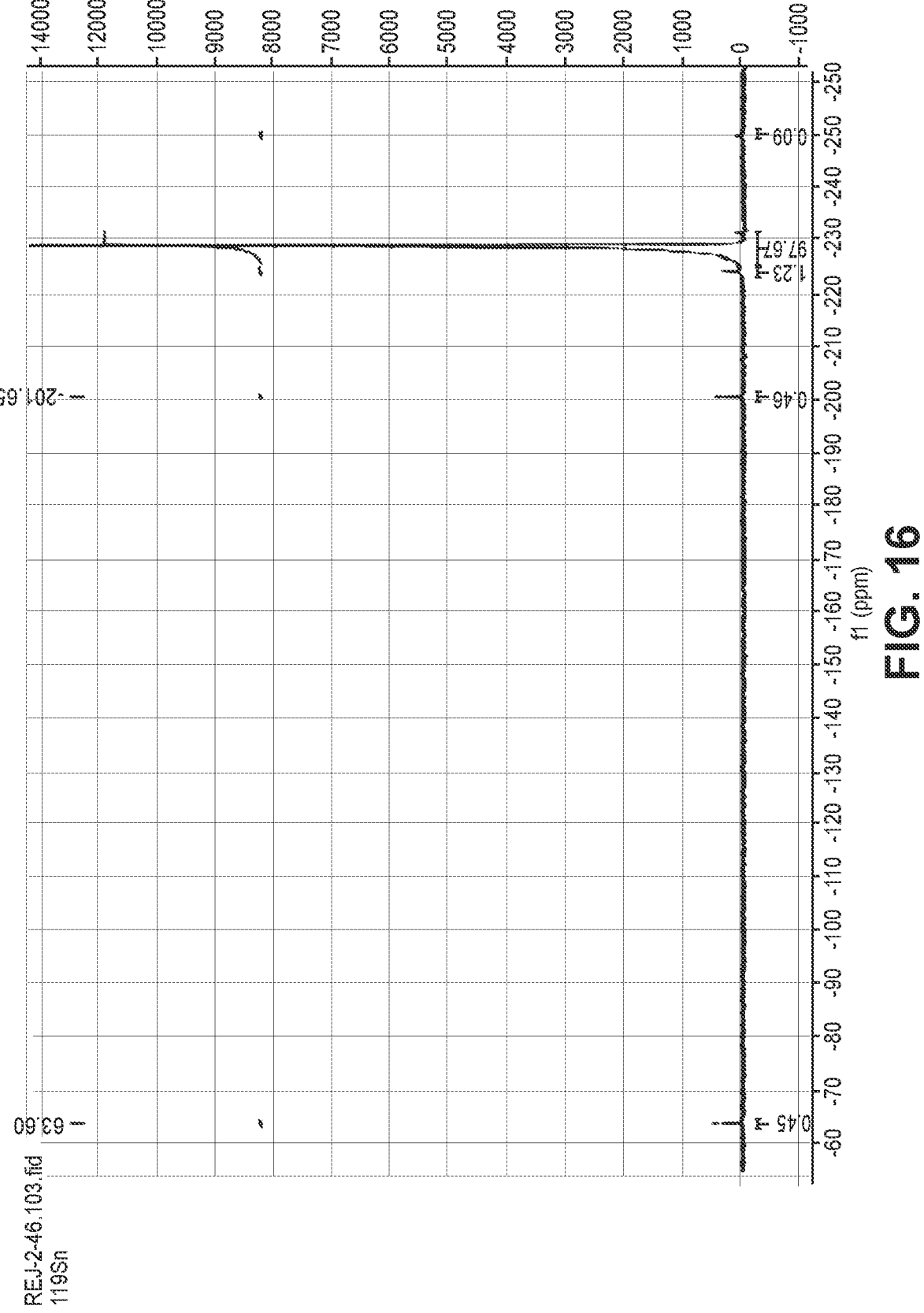
FIG. 16 is a $^{119}$Sn NMR spectra of 3-iodobenzyltin tris(tert-butoxide) (IBT).
Figure 17:
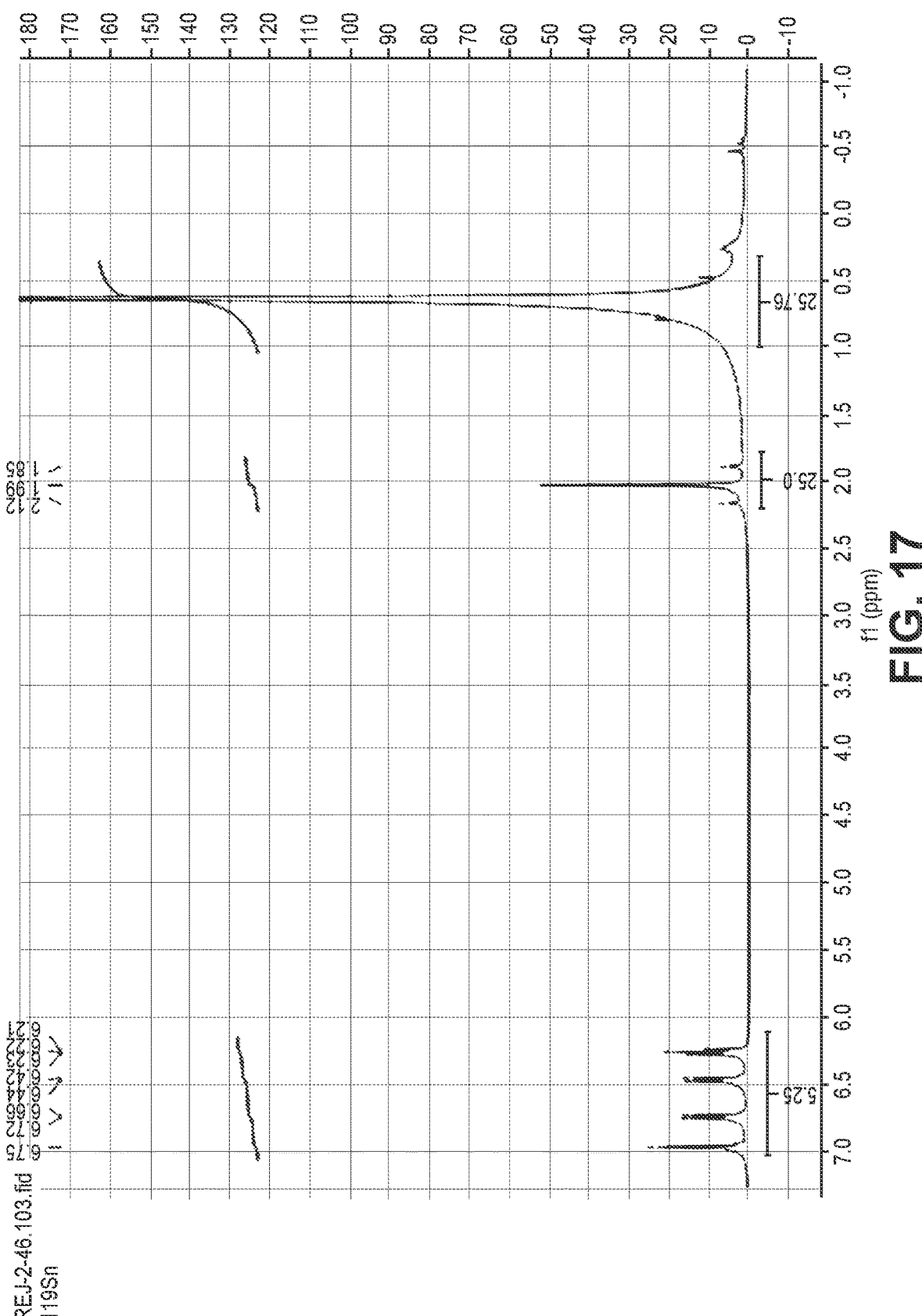
FIG. 17 is a $^1$H NMR spectra of IBT.

Example 8. Preparation of $(C_6H_4I)CH_2Sn(CCSi (CH_3)_3)_3$ and $(C_6H_4I)CH_2Sn(OC(CH_3)_3)_3$ This example presents the synthesis of a iodobenzyl tin triacetylide, $(C_6H_4I)CH_2Sn(CCSi(CH_3)_3)_3$, abbreviated as 3-iodobenzylSn(CCSiMc$_3$)$_3$, via an oxidative stannylation reaction involving trimethylsilylacetylene (TMSA), SnCl$_2$, n-butyl lithium, potassium tert-butoxide, iodobenzylbromide and its subsequent conversion to a 3-iodobenzyltin tris(tert-butoxide), $(C_6H_4I)CH_2Sn(OC(CH_3)_3)_3$, abbreviated as iodobenzylSn(O-tBu)$_3$.

nButyllithium was added to a cold (−50° C.) solution of trimethylsilylacetylene (TMSA) in diethyl ether. After a few minutes, a slurry of tin (II) chloride and potassium tert-butoxide in THF was added. The contents were stirred while warming to RT for at least 2 h. The newly formed presumed intermediate potassium tris(trimethylsilylacetylide) stannane was added slowly to a cold (−50° C.) solution of 3-iodobenzylbromide in THF. After stirring overnight, solvent was removed in vacuo and the product was extracted with pentane. Salts were removed by filtration and pentane was removed in vacuo to give a white semi-solid. Triethylamine (5.0 eq) and tert-butanol (5.0 eq) were added and the solution was heated to 80° C. for 40h. Excess TEA/tBuOH was removed in vacuo and the trialkoxide product was isolated by distillation. Further purification was achieved through fractional distillation. The $^{119}Sn$ NMR and the $^1H$ NMR spectra of the isolated product is shown in FIG. 16 and FIG. 17, respectively.

Further Inventive Concepts

In addition to the subject matter claimed below, the invention further covers the following inventive concepts.

1. A compound represented by the formula RSn(C≡C-SiR'$_3$)$_3$, where R' and R are independently a hydrocarbyl group with from 1 to 31 carbon atoms and optional unsaturated carbon-carbon bonds, optional aromatic groups and optional hetero atoms.

2. The compound of inventive concept 1 wherein R is methyl(CH$_3$—), ethyl(CH$_3$CH$_2$—), isopropyl (CH$_3$CH$_3$HC—), t-butyl((CH$_3$)$_3$C—), t-amyl(CH$_3$CH$_2$ (CH$_3$)$_2$C—), sec-butyl (CH$_3$ (CH$_3$CH$_2$)CH—), neopentyl(CH$_3$)$_3$CCH$_2$—), cyclohexyl, cyclopentyl, cyclobutyl, or cyclopropyl.

3. The compound of inventive concept 1 wherein R' is a linear or branched alkyl (—C$_n$H$_{2n+1}$, n is 1 to 5).

4. A solution comprising an aprotic organic solvent and the compound of inventive concept 1 having a tin concentration from about 0.0001M to about 1 M.

5. A halogenated hydrocarbyl tin compound represented by the formula R'R"ACSnL$_3$, where A is a halogen atom (F, Cl, Br or I) or an aromatic ring with at least one halogen substituent, where R' and R" are independently H, a halogen, or a hydrocarbyl group with from 1 to 15 carbon atoms and optional unsaturated carbon-carbon bonds, optional aromatic groups and optional hetero atoms, and L is LH, where LH is a hydrolysable ligand, or O$_x$(OH)$_{3-x}$, 0<x<3.

6. The halogenated hydrocarbyl tin compound of inventive concept 5 wherein A is I.

7. The halogenated hydrocarbyl tin compound of inventive concept 6 wherein R' and R" are both CH$_3$.

8. The halogenated hydrocarbyl tin compound of inventive concept 5 wherein A is C$_6$H$_4$I.

9. The halogenated hydrocarbyl tin compound of inventive concept 5 wherein L is NR'$_2$, where R' is a hydrocarbyl group with from 1 to 31 carbon atoms and optional unsaturated carbon-carbon bonds, optional aromatic groups and optional hetero atoms 10. The halogenated hydrocarbyl tin compound of inventive concept 5 wherein L is C≡CR$^S$, where R$^S$ is SiR$^1_3$ or R$^2$, the three R$^1$ are independently H or R$^2$, and the R$^2$ are independently a hydrocarbyl group with from 1 to 31 carbon atoms and optional unsaturated carbon-carbon bonds, optional aromatic groups and optional hetero atoms.

11. A solution comprising an aprotic organic solvent and the compound of inventive concept 5 having a tin concentration from about 0.0001M to about 1 M.

12. A hydrocarbyl tin compound represented by the formula R'R" (R"O) CSnL$_3$ where R', R" and R" are independently H or hydrocarbyl groups having from 1 to 15 carbon atoms and optional unsaturated carbon-carbon bonds, optional aromatic groups and optional hetero atoms, and L is LH, where LH is a hydrolysable ligand, or $O_x(OH)_{3-x}$, $0<x<3$.

13. The hydrocarbyl tin compound of inventive concept 12 wherein R' and R" are H, and R" is $CH_3$.

14. The hydrocarbyl tin compound of inventive concept 12 wherein L is $NR'_2$, where R' is a hydrocarbyl group with from 1 to 31 carbon atoms and optional unsaturated carbon-carbon bonds, optional aromatic groups and optional hetero atoms 15. The hydrocarbyl tin compound of inventive concept 12 wherein L is $C≡CR^S$, where $R^S$ is $SiR^1_3$ or $R^2$, the three $R^1$ are independently H or $R^2$, and the $R^2$ are independently a hydrocarbyl group with from 1 to 31 carbon atoms and optional unsaturated carbon-carbon bonds, optional aromatic groups and optional hetero atoms.

16. A solution comprising an aprotic organic solvent and the compound of inventive concept 12 having a tin concentration from about 0.005M to about 1.4 M.

17. A hydrocarbyl tin compound represented by the formula R'R" (N≡C) $CSnZ_3$ where R' and R" are independently hydrocarbyl groups having from 1 to 15 carbon atoms and optional unsaturated carbon-carbon bonds, optional aromatic groups and optional hetero atoms, and Z is L, where L is a hydrolysable ligand, or $O_x(OH)_{3-x}$, $0<x<3$.

18. The hydrocarbyl tin compound of inventive concept 17 wherein R' and R" are independently a linear or branched alkyl ($—C_nH_{2n+1}$, n is 1 to 5).

19. The hydrocarbyl tin compound of inventive concept 17 wherein Z is $NR'_2$, where R' is a hydrocarbyl group with from 1 to 31 carbon atoms and optional unsaturated carbon-carbon bonds, optional aromatic groups and optional hetero atoms 20. The hydrocarbyl tin compound of inventive concept 17 wherein L is $C≡CR^S$, where $R^S$ is $SiR^1_3$ or $R^2$, the three $R^1$ are independently H or $R^2$, and the $R^2$ are independently a hydrocarbyl group with from 1 to 31 carbon atoms and optional unsaturated carbon-carbon bonds, optional aromatic groups and optional hetero atoms.

21. A solution comprising an aprotic organic solvent and the compound of inventive concept 17 having a tin concentration from about 0.005M to about 1.4 M.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term "about" herein refers to expected uncertainties in the associated values as would be understood in the particular context by a person of ordinary skill in the art.

What is claimed is:

1. A method for forming an alkali metal tin composition, the method comprising:

reacting (A) ML, wherein M is Li, Na, K, Cs or a combination thereof and L is a dialkylamide represented by the formula $—NR'_2$ or an acetylide represented by the formula $—C≡CR^S$, wherein $R^S$ is $SiR"_3$ or R', the three R" are independently H or R', and the R' are independently a hydrocarbyl group with from 1 to 31 carbon atoms and optional unsaturated carbon-carbon bonds, optional aromatic groups and optional hetero atoms, (B) tin (II) halide, represented by the formula $SnX_2$, wherein X is F, Cl, Br, I or a mixture thereof, in an organic solvent to form an alkali metal tin composition, wherein the alkali metal tin composition comprises a $SnL_3$ moiety, which is $Sn(NR'_2)_3$ or $Sn(C≡CR^S)_3$, present with associated metal cations comprising M, and (C) $M'''X_2$, wherein $M'''$ is beryllium, magnesium, calcium, strontium, barium, zinc, cadmium, mercury or a combination thereof and X=F, Cl, Br, I or a mixture thereof, to form an alkali metal alkaline earth metal/pseudo-alkaline earth metal tin composition.

2. The method of claim 1 wherein $M'''X_2$ is $ZnCl_2$.

3. The method of claim 1 wherein the reaction of ML and $SnX_2$ further comprises reacting with $M'OR^0$, where M' is Na, K, Cs or a combination thereof and $R^0$ is a hydrocarbyl group with from 1 to 31 carbon atoms and optional unsaturated carbon-carbon bonds, optional aromatic groups and optional hetero atoms, and wherein the associated metal cations further comprise M'.

4. The method of claim 1 wherein M is Li and/or L is an acetylide.

5. The method of claim 3 wherein M is Li and M' is K.

6. The method of claim 1 wherein reacting ML and tin (II) halide in an organic solvent is initiated at a temperature of no more than about 0° C. and the reaction is continued for a time of at least about two minutes.

7. The method of claim 1 wherein R' is methyl($CH_3—$), ethyl($CH_3CH_2—$), isopropyl($CH_3CH_3HC—$), t-butyl $((CH_3)_3C—)$, t-amyl($CH_3CH_2$ $(CH_3)_2C—$), sec-butyl($CH_3$ $(CH_3CH_2)CH—$), neopentyl($(CH_3)_3CCH_2—$), cyclohexyl, cyclopentyl, cyclobutyl, or cyclopropyl.

8. The method of claim 1 wherein the molar ratio of ML to tin (II) halide is approximately 3:1 and $M'''$ to Sn is approximately 1:1.

9. An alkali metal alkaline earth metal/pseudo-alkaline earth metal tin composition formed according to the method of claim 1.

10. A method for forming an alkali metal tin composition, the method comprising:

reacting ML, wherein M is Li, Na, K, Cs or a combination thereof and L is an acetylide represented by the formula-$C≡CR^S$, wherein $R^S$ is $SiR"_3$ or R', the three R" are independently H or R', and the R' are independently a hydrocarbyl group with from 1 to 31 carbon atoms and optional unsaturated carbon-carbon bonds, optional aromatic groups and optional hetero atoms, and tin (II) halide, represented by the formula $SnX_2$, wherein X is F, Cl, Br, I or a mixture thereof, in an organic solvent to form an alkali metal tin composition, wherein the alkali metal tin composition comprises a $SnL_3$ moiety, which is $Sn(C≡CR^S)_3$, present with associated metal cations comprising M.

11. The method of claim 10 wherein the reaction of ML and $SnX_2$ further comprises reacting with $M'OR^O$, where M' is Na, K, Cs or a combination thereof and $R^O$ is a hydrocarbyl group with from 1 to 31 carbon atoms and optional unsaturated carbon-carbon bonds, optional aromatic groups and optional hetero atoms, and wherein the associated metal cations further comprise M'.

12. The method of claim 10 wherein M is Li.

13. The method of claim 10 wherein the reaction is initiated at a temperature of no more than about 0° C. and the reaction is continued for a time of at least about two minutes.

14. The method of claim 10 wherein R' is methyl($CH_3$—), ethyl($CH_3CH_2$—), isopropyl($CH_3CH_3HC$—), t-butyl (($CH_3)_3C$—), t-amyl($CH_3CH_2$ $(CH_3)_2C$—), sec-butyl($CH_3$ ($CH_3CH_2)CH$—), neopentyl($CH_3)_3CCH_2$—), cyclohexyl, cyclopentyl, cyclobutyl, or cyclopropyl.

15. The method of claim 10 wherein the molar ratio of ML to tin (II) halide is approximately 3:1.

16. An alkali metal tin composition formed according to the method of claim 10.

17. The method of claim 1 wherein M is Li.

* * * * *